United States Patent
Xu et al.

(10) Patent No.: US 9,717,081 B2
(45) Date of Patent: *Jul. 25, 2017

(54) METHOD, DEVICE, AND SYSTEM FOR MANAGING UPLINK CARRIER FREQUENCIES

(71) Applicant: Huawei Technologies Co., Ltd., Shenzhen (CN)

(72) Inventors: Tingwei Xu, Shanghai (CN); Xiaofei Ma, Shanghai (CN); Jie Ma, Beijing (CN); Xiaoxiao Zheng, Shanghai (CN); Zongjie Wang, Shanghai (CN); Xueli Ma, Shanghai (CN); Jing Li, Shanghai (CN); Chuanfeng He, Beijing (CN); Bo Yang, Allen, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/946,025

(22) Filed: Nov. 19, 2015

(65) Prior Publication Data

US 2016/0081083 A1 Mar. 17, 2016

Related U.S. Application Data

(63) Continuation of application No. 14/317,161, filed on Jun. 27, 2014, now Pat. No. 9,210,704, which is a (Continued)

(30) Foreign Application Priority Data

Jan. 23, 2009 (CN) .......................... 2009 1 0001150
Apr. 28, 2009 (CN) .......................... 2009 1 0137954

(51) Int. Cl.
*H04W 72/04* (2009.01)
*H04L 1/00* (2006.01)
(Continued)

(52) U.S. Cl.
CPC .......... *H04W 72/0433* (2013.01); *H04L 1/00* (2013.01); *H04L 5/0035* (2013.01);
(Continued)

(58) Field of Classification Search
None
See application file for complete search history.

(56) References Cited

U.S. PATENT DOCUMENTS 9,210,704 B2 12/2015 Xu et al.
2005/0207374 A1* 9/2005 Petrovic et al. ............. 370/331
(Continued)

FOREIGN PATENT DOCUMENTS

CN 1610421 A 4/2005
CN 1722892 A 1/2006
(Continued)

OTHER PUBLICATIONS

"3rd Generation Partnership Project; Technical Specification Group Radio Access Network; Physical Channels and Mapping of Transport Channels onto Physical Channels (FDD) (Release 8)," 3GPP TS 25.211 V8.3.0, Dec. 2008, 56 pages.
(Continued)

*Primary Examiner* — Christopher Crutchfield
*Assistant Examiner* — Tito Pham
(74) *Attorney, Agent, or Firm* — Slater Matsil, LLP

(57) ABSTRACT

A method for managing uplink carrier frequencies is provided, which is applicable to the field of communication. The method includes the following steps: A state switching response message sent by a UE is received, where the state switching response message includes a result of state switching performed by on a secondary uplink carrier serving cell; The result of the state switching is notified to a secondary uplink carrier non-serving cell in a secondary carrier active set through an RNC. A device and a system for managing
(Continued)

uplink carrier frequencies are further provided. Through the method, device, and system provided in embodiments of the present invention, the uplink carrier frequencies are managed, so as to facilitate transmission of uplink data during multi-cell collaboration.

5 Claims, 15 Drawing Sheets

Related U.S. Application Data continuation of application No. 13/293,859, filed on Nov. 10, 2011, now Pat. No. 8,861,457, which is a continuation of application No. 13/255,526, filed as application No. PCT/CN2010/070324 on Jan. 22, 2010, now abandoned.

(51) Int. Cl.
    *H04W 36/06*     (2009.01)
    *H04L 5/00*     (2006.01)
    *H04W 88/12*     (2009.01)

(52) U.S. Cl.
    CPC ........... *H04L 5/0098* (2013.01); *H04W 36/06* (2013.01); *H04W 72/0453* (2013.01); *H04L 5/0058* (2013.01); *H04L 2001/0092* (2013.01); *H04W 88/12* (2013.01)

(56) References Cited

U.S. PATENT DOCUMENTS

| | | | |
|---|---|---|---|
| 2006/0268717 A1 | 11/2006 | Kanterakis | |
| 2006/0274712 A1 | 12/2006 | Malladi et al. | |
| 2007/0066340 A1 | 3/2007 | Yoon et al. | |
| 2008/0287068 A1 | 11/2008 | Etemad | |
| 2009/0028103 A1* | 1/2009 | Wang et al. | 370/329 |
| 2009/0181710 A1* | 7/2009 | Pani et al. | 455/509 |
| 2010/0130219 A1* | 5/2010 | Cave et al. | 455/450 |
| 2010/0278130 A1 | 11/2010 | Sambhwani et al. | |
| 2011/0249566 A1* | 10/2011 | Bergman et al. | 370/241 |

FOREIGN PATENT DOCUMENTS

| | | |
|---|---|---|
| CN | 1722895 A | 1/2006 |
| CN | 1728863 A | 2/2006 |
| CN | 1731749 A | 2/2006 |
| CN | 1731882 A | 2/2006 |
| CN | 1734976 A | 2/2006 |
| CN | 1734977 A | 2/2006 |
| CN | 1735258 A | 2/2006 |
| CN | 1735259 A | 2/2006 |
| CN | 1822695 A | 8/2006 |
| CN | 1832621 A | 9/2006 |
| CN | 1893341 A | 1/2007 |
| CN | 1897744 A | 1/2007 |
| CN | 1941988 A | 4/2007 |
| CN | 101141779 A | 3/2008 |
| CN | 101145826 A | 3/2008 |
| CN | 101166346 A | 4/2008 |
| CN | 101188848 A | 5/2008 |
| CN | 101268635 A | 9/2008 |
| CN | 101500291 A | 8/2009 |
| CN | 101547477 A | 9/2009 |
| CN | 101547486 A | 9/2009 |
| CN | 101616450 A | 12/2009 |
| CN | 101651851 A | 2/2010 |
| CN | 101729137 A | 6/2010 |
| CN | 101790200 A | 7/2010 |
| EP | 2368397 A1 | 9/2011 |
| EP | 2648468 A1 | 10/2013 |
| WO | 2006116102 A2 | 11/2006 |
| WO | 2009155480 A1 | 12/2009 |
| WO | 2010071547 A1 | 6/2010 |

OTHER PUBLICATIONS

"3rd Generation Partnership Project; Technical Specification Group Radio Access Network; Enhanced Uplink; Overall Description; Stage 2 (Release 8)," 3GPP TS 25.319 V8.4.0, Dec. 2008, 65 pages.
3rd Generation Partnership Project; Technical Specification Group Radio Access Network; Radio Resource Control (RRC); Protocol Specification (Release 8), 3GPP TS 25.331, V8.5.0, Dec. 2008, 10 pages.
3rd Generation Partnership Project; Technical Specification Group Radio Access Network; ULTRAN Iub Interface Node B Application Part (NBAP) Signalling (Release 8), 3GPP TS 433, V8.3.0, Dec. 2008, 1105 pages.
Bergman et al., "Multicarrier Uplink Transmission," U.S. Appl. No. 61/139,250, Dec. 19, 2008, 13 pages.
Pani et al., "Method for Controlling Uplink Transmission in Multicarrie Wireless Communication," U.S. Appl. No. 61/117,854, Nov. 25, 2008, 41 pages.
"Introduction of Dual-Cell HSDPA Operation on Adjacent Carriers," Source to WG: Ericsson, Huawei, Nokia, Nokia Siemens Networks, Philips, Qualcomm Europe, Samsung, Source to TSG: R1, Work Item Code: RANimp-DCHSDPA, 3GPP TSG-RAN WG1 Meeting #54bis, R1-084031, Change Request, 25.214 CR 0497, Revision 4, Version 8.3.0, Sep. 29-Oct. 3, 2008, 85 pages.
"UE Implementation Impact Due to DC-HSUPA," Agenda Item: 9, Source: Qualcomm Europe, Document for: Discussion, 3GPP TSG RAN WG1 Meeting #55bis, R1-090434, Jan. 12-16, 2009, 12 pages.
"Clarification of ACK Transmission in Response to HS-SCCH Order," Source to WG: Ericsson, Work Item Code: RANimp-CPC, Category: F, Release 7, Change Request, 25.211CR 0262, Current Version: 7.6.0, 3GPP TSG-RAN WG1 Meeting #56, R1-090962, Feb. 9-13, 2009, 4 pages.
"Design Considerations for DC-HSUPA Operation," Agenda Item: 6, Source: Ericsson, Document for: Discussion and Decision, 3GPP TSG RAN WG1 Meeting #56bis, R1-091315, Mar. 23-28, 2009, 4 pages.
"Consideration on Carrier Activation/Deactivation for DC-HSUPA," Agenda Item: 6, Source: Huawei, Document for: Discussion, 3GPP TSG RAN WG1 Meeting#56bis, R1-091541, Mar. 23-27, 2009, 2 pages.
"Considerations on Carrier Activation/Deactivation for DC-HSUPA," Agenda Item: 6, Source: Huawei, Document for: Discussion, 3GPP TSG RAN WG1 Meeting #56bis, R1-091541, Mar. 23-27, 2009, 3 pages.
"DC-HSUPA Working Assumptions," Agenda Item: 9, Source: Qualcomm Europe, Document for: Discussion, 3GPP TSG-RAN WG1 #56bis, R1-091598, Mar. 23-27, 2009, 8 pages.
"DC-HSUPA (de)activation," Agenda Item: 6, Source: Ericsson, Document for: Discussion and Decision, 3GPP TSG RAN WG1 Meeting #57, R1-091892, May 4-8, 2009, 4 pages.
"Discussion on Supplementary Carrier Controlling," Agenda Item: 7.4.10, Source: HUAWEI, Document for: Discussion, Decision, 3GPP TSG-RAN WG2 #62bis, R2-083520, Jun. 30-Jul. 4, 2008, 2 pages.
"Proposed Principles for Dual-Cell HSUPA Operation," Agenda Item: 18, Source: Ericsson, Document for: Discussion and Agreement, 3GPP TSG-RAN WG3 #63bis, R3-090838, Mar. 23-26, 2009, 4 pages.
"Activation/De-Activation of Secondary UL Carrier in DC-HSUPA," Agenda Item: 18, Source: Qualcomm Europe, Document for: Discussion, 3GPP TSG-RAN WG3 #64, R3-091222, May 4-8, 2009, 6 pages.
"TP: Lub/Lur Aspects of DC-HSUPA," Souce to WG: Ericsson, Source to TSG: R3, Work Item Code: RANlimp-DC HSUPA, Category: B, Change Request, 25.319 CR CRNum, Current Version: 8.5.0, 3GPP TSG-RAN3 Meeting #64, Draft R3-091458, May 4-8, 2009, 8 pages.

* cited by examiner

US 9,717,081 B2

METHOD, DEVICE, AND SYSTEM FOR MANAGING UPLINK CARRIER FREQUENCIES

This application is a continuation of U.S. patent application Ser. No. 14/317,161, filed on Jun. 27, 2014, which is a continuation of U.S. patent application Ser. No. 13/293,859, filed on Nov. 10, 2011, now U.S. Pat. No. 8,861,457, which is a continuation of U.S. patent application Ser. No. 13/255,526, filed on Sep. 9, 2011, which is a National Stage of International Application No. PCT/CN2010/070324, filed on Jan. 22, 2010 which claims priority to Chinese Patent Application No. 200910001150.3, filed on Jan. 23, 2009 and Chinese Patent Application No. 200910137954.6, filed on Apr. 28, 2009. The aforementioned patent applications are hereby incorporated by reference in their entireties.

TECHNICAL FIELD

The present invention relates to the field of communication, and more particularly to a method, device, and system for managing uplink carrier frequencies.

BACKGROUND

In technology evolution of the 3rd Generation Partnership Project (3GPP), in order to enhance the amount of uplink data of a service and uplink service coverage, it is considered to introduce uplink multi-cell High Speed Uplink Packet Access (HSUPA) collaboration technology, that is, in a data uplink direction, data channels working at different carrier frequencies are bundled together to transmit data, and one User Equipment (UE) may simultaneously receive data from data channels at multiple carrier frequencies.

For example, dual-cell HSUPA collaboration is to establish connections to a UE and a base station simultaneously from two cells working at different uplink carrier frequencies, so that uplink data sent by the UE can be simultaneously sent through the connections established with the two cells.

However, the prior art does not provide a specific implementation solution to manage uplink carrier frequencies of multi-cell HSUPA.

SUMMARY

In order to manage uplink carrier frequencies of multi-cell HSUPA, the present invention is directed to a method, device, and system for managing uplink carrier frequencies.

One aspect of the present invention provides a method for managing uplink carrier frequencies. The method includes the following steps.

A state switching response message sent by a UE is received, where the state switching response message includes a result of state switching performed by the UE on a secondary uplink carrier serving cell;

A result of the state switching is notified to a secondary uplink carrier non-serving cell in a secondary carrier active set through a Radio Network Controller (RNC).

Another aspect of the present invention provides a device for managing uplink carrier frequencies. The device includes:

a receiving unit, which is configured to receive a state switching response message sent by a UE, where the state switching response message includes a result of state switching performed by the UE on a secondary uplink carrier serving cell;

a notifying unit, which is configured to notify the result of the state switching to a non secondary uplink carrier serving cell in a secondary carrier active set through an RNC.

Still another aspect of the present invention provides a system for managing uplink carrier frequencies. The system includes a base station and an RNC.

The base station is configured to receive a state switching response message sent by a UE, where the state switching response message includes a result of state switching performed by the UE on a secondary uplink carrier serving cell; and send the result of the state switching to the RNC.

The RNC is configured to send the result of the state switching to a secondary uplink carrier non-serving cell in a secondary carrier active set.

The method, device, and system for managing uplink carrier frequencies according to the present invention may be adopted to inform the base station, the RNC and the secondary uplink carrier non-serving cell in the secondary carrier active set of the result of the state switching performed by the UE on the secondary uplink carrier serving cell, so as to manage the uplink carrier frequencies of the multi-cell HSUPA.

DETAILED DESCRIPTION OF ILLUSTRATIVE EMBODIMENTS

When a user uses some uplink sensitive services (such as Email, image, and video uploading), a large amount of uplink data is generated, which requires higher load for uplink carrier frequencies. At this time, if the load of a cell accessed by a UE is heavy in an uplink direction, a large amount of uplink data would be sent with low efficiency and time delay. As a result, the user experience is affected.

In order to solve the problem that the efficiency in sending the data is low when the uplink data amount is large, multi-cell HSUPA collaboration may be used to send the uplink data, that is, data is sent through collaboration of multiple uplink cells, so as to reduce data load on a single cell. However, the implementation methods are not provided in the prior art to solve the following problems: how to activate multiple cells to send uplink data simultaneously when the UE generates a large amount of uplink data, how to make a part of the multiple cells, which are not needed, disconnected to decrease interference among multiple carrier frequencies when the UE does not need the multiple cells to send the uplink data, and how to dynamically adjust the quantity of uplink cells used by the UE to manage activation and deactivation reasonably.

A first embodiment of the present invention is described in the following with reference to accompanying drawings.

Figure 1:
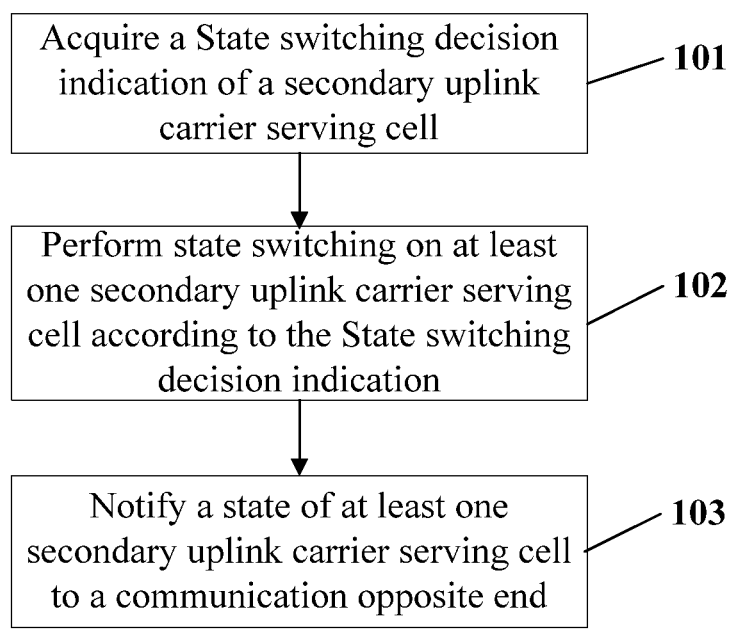
FIG. 1 is a flow chart of a method for managing uplink carrier frequencies according to a first embodiment of the present invention.

In the first embodiment, the present invention provides a method for managing uplink carrier frequencies so as to dynamically adjust the number of uplink cells. As shown in FIG. 1, the method includes the following steps.

In step 101, a state switching decision indication of a secondary uplink carrier serving cell is acquired.

In step 102, state switching is performed on at least one secondary uplink carrier serving cell according to the state switching decision indication.

In step 103, a state of the at least one secondary uplink carrier serving cell is notified to a communication opposite end.

In the method for managing uplink carrier frequencies provided in this embodiment, state switching management of the secondary uplink carrier serving cell is triggered through the state switching decision indication, the state switching of at least one secondary uplink carrier serving cell is performed according to the state switching decision indication, and the state of at least one secondary uplink carrier serving cell is notified to the communication opposite end. In this way, a mechanism to realize multi-cell collaboration for data transmission in the uplink direction is provided, and a problem that uplink carrier frequencies management cannot be performed through multi-cell HSUPA collaboration is solved.

A second embodiment of the present invention is described in the following with reference to an accompanying drawing.

Figure 2:
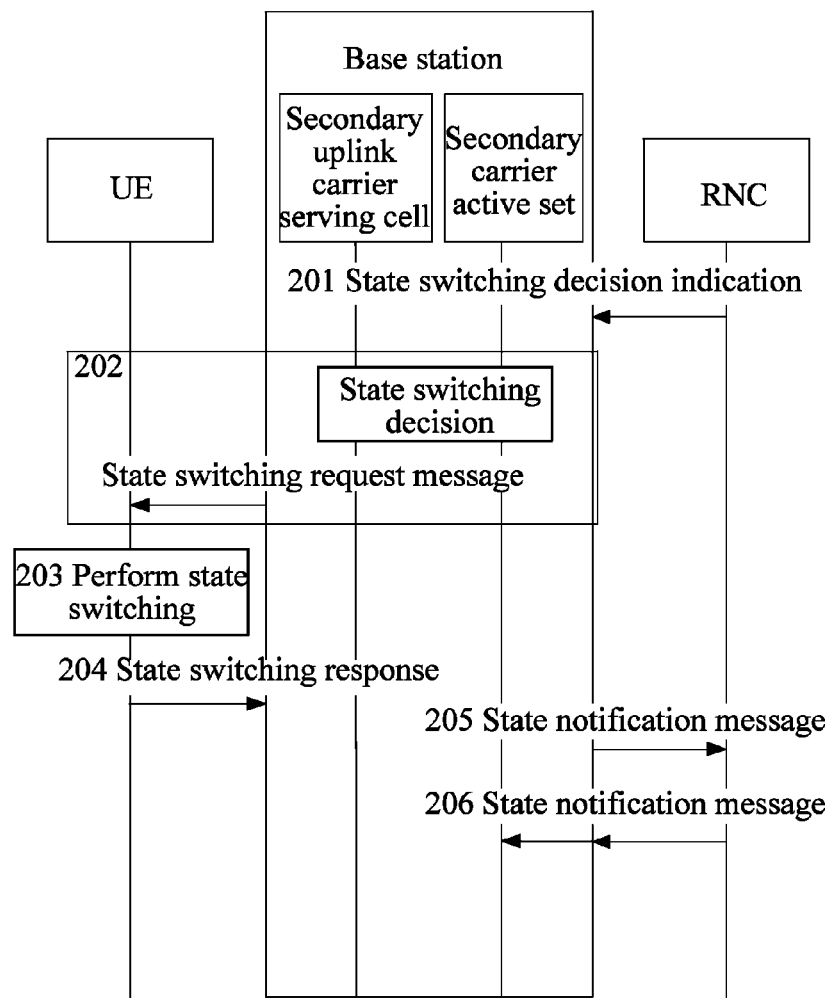
FIG. 2 is a flow chart of a method for managing uplink carrier frequencies according to a second embodiment of the present invention.

When a UE needs to send a large quantity of uplink data to a base station, the UE may send uplink data simultaneously on a primary carrier cell and one or more secondary uplink carrier serving cells by establishing connections with cells at multiple carrier frequencies through multi-cell collaboration, so as to increase bandwidth of the uplink data sent. When the UE does not need to send the uplink data through multi-cell collaboration, an unused cell may be deactivated, thereby reducing the number of cells used by the UE and decreasing interference among cells at different frequencies. In this embodiment, take dual-cell collaboration in sending uplink data for example. For ease of description, the dual cells are respectively designated as a primary uplink carrier cell and a secondary uplink carrier serving cell. The primary uplink carrier cell works at a primary uplink carrier frequency, and the secondary uplink carrier serving cell works at a secondary uplink carrier frequency. All cells working at the same primary uplink carrier form one primary uplink carrier cell active set, which includes one primary uplink carrier serving cell. All cells working at the same secondary uplink carrier form one secondary uplink carrier cell active set, which includes one secondary uplink carrier serving cell. In this embodiment, the secondary uplink carrier serving cell may be a secondary carrier Enhanced Dedicated Channel (E-DCH) serving cell. As shown in FIG. 2, the method for managing uplink carrier frequencies according to this embodiment includes the following steps:

In step 201, the base station receives a state switching decision indication.

When the base station is switched on and joins into a network, an RNC (Radio Network Controller) sends to the base station the state switching decision indication which instructs the base station to perform measurement and judgment according to the state switching decision indication and implement activation and deactivation operations of the secondary uplink carrier serving cell.

In this step, the base station receives the state switching decision indication. The state switching decision indication carries decision control. The decision control includes multiple decision objects, such as uplink data amount control, uplink load, and secondary uplink carrier Serving Grant (SG) control (the uplink load and the secondary uplink carrier SG are decision objects related to uplink signal quality). The types of the decision objects are numerous in the field of communication, and will not enumerated one by one here. The decision objects are used to determine whether it is needed to activate other secondary carrier cells to transmit uplink data. The decision control further includes multiple decision parameters, such as a measurement time window (the measurement time window is a measurement interval, and a measurement value of a certain decision object is a mean of measurement values of the decision objects within the measurement interval), an activation threshold (that is, an activation threshold is a condition for triggering to activate other secondary carrier cells, and the activation threshold includes the amount of uplink data of a user and an uplink signal quality criterion; when the amount of uplink data of the user exceeds the activation threshold, and the signal quality of the secondary uplink carrier serving cell reaches the quality criterion of the uplink signal, the secondary uplink carrier serving cell may be activated to transmit uplink data), and a deactivation threshold (that is, a deactivation threshold is a condition for triggering to deactivate the secondary uplink carrier serving cell, and includes the amount of uplink data of the user and the quality criterion of the uplink signal; when the amount of uplink data of the user is below the deactivation threshold, or the signal quality of the secondary uplink carrier serving cell does not reach the quality criterion of the uplink signal, the secondary uplink carrier serving cell may be deactivated, and the secondary uplink carrier serving cell is not used for transmitting the uplink data).

The activation threshold and the deactivation threshold may be one same value, or two different values. The activation threshold may be slightly higher than the deactivation threshold. When a data transmission amount is between the activation threshold and the deactivation threshold, a state of the secondary uplink carrier serving cell does not change.

In other embodiments of the present invention, two or more secondary uplink carrier serving cells may be activated to transmit the uplink data of the user. In this case, the activation threshold value may include multiple thresholds, and the thresholds increase in sequence. For example, the thresholds are 5 M, 8 M and 10 M. The amount of the uplink data of the user is increased gradually. When the amount of the uplink data of the user exceeds 5 M, a first secondary uplink carrier serving cell is activated. When the amount exceeds 8 M, a second secondary uplink carrier serving cell is activated. When the amount exceeds 10 M, a third secondary uplink carrier serving cell is activated, and so forth. Multiple secondary uplink carrier serving cells work at different secondary uplink carrier frequencies. The activation threshold may also include only one threshold. When the amount exceeds this threshold, all of other available cells at secondary carrier frequencies of a base station at which the UE is currently located are activated as the secondary uplink carrier serving cells.

Corresponding to multiple uplink activation thresholds, the deactivation threshold value may also include multiple thresholds. For example, the thresholds are 5 M, 8 M and 10 M. The amount of the uplink data of the user is also decreased gradually. When the amount of the uplink data of the user is below 10 M, a secondary uplink carrier serving cell is deactivated. When the amount is below 8 M, another secondary uplink carrier serving cell is deactivated, and so forth. Definitely, when there are multiple uplink activation thresholds, it is also possible that only one deactivation threshold is used. For example, the activation thresholds are 5 M, 8 M and 10 M, but only one deactivation threshold, such as 5 M, is used. When the amount of the uplink data is below 5 M, all secondary uplink carrier serving cells are deactivated.

In the method for managing uplink carrier frequencies according to this embodiment, the principle for activating the secondary uplink carrier serving cell or deactivating the secondary uplink carrier serving cell in multi-cell collaboration is essentially the same as the principle for activating the secondary uplink carrier serving cell or deactivating the secondary uplink carrier serving cell in dual-cell collaboration, and is not described in detail here.

In step 202, the base station performs state switching decision, and sends a state switching request message to the UE.

In this step, the base station measures a related decision object according to the state switching decision indication received in step 201, and compares the measurement result with the decision parameter, so as to determine whether it is needed to activate the secondary uplink carrier serving cell.

If the UE is in a dual-cell uplink collaboration activated state, that is, the UE is connected with the base station through the primary carrier cell and the secondary uplink carrier serving cell simultaneously for sending the uplink data. In one measure window, as long as a measurement value of one control object satisfies the deactivation threshold, for example, when the amount of the uplink data transmitted by the secondary uplink carrier serving cell is very small, or when the signal quality of the secondary uplink carrier serving cell is poor and cannot satisfy the quality criterion of the uplink signal, the base station performs the deactivation operation on the secondary uplink carrier serving cell. Specifically, a deactivation request message is sent to the UE, where the deactivation request message carries an identifier of the secondary uplink carrier frequency which the secondary uplink carrier serving cell uses (the identifier may be a frequency value of the secondary uplink carrier frequency, or a unique identifier allocated for the secondary uplink carrier frequency by the system); and the UE is requested to stop sending uplink data through the secondary uplink carrier serving cell. The deactivation request message may be a physical layer message borne on a physical layer channel such as a high speed shared control channel (HS-SCCH), or an enhanced dedicated channel absolute grant channel (E-AGCH) or an enhanced dedicated channel relative grant channel (E-RGCH), or may be a media access control (MAC) protocol data unit (PDU).

If the UE is in a dual-cell uplink collaboration deactivated state, that is to say, the UE currently sends the uplink data through only the primary carrier cell. In one measure window, the base station measures cells at all other carrier frequencies of the base station except for the carrier frequency of the primary carrier cell according to information in the state switching decision indication. If the amount of the uplink data of the UE exceeds the activation threshold, and the signal quality of the secondary carrier serving cell satisfies the signal quality criterion, the cell is activated, and a part of the uplink data on the primary carrier cell is allocated to the secondary uplink carrier serving cell for transmission. The activating operation specifically includes: sending, by the base station, an activation request message to the UE. The activation request message carries an identifier of the secondary uplink carrier frequency which the selected secondary uplink carrier serving cell uses (the identifier may be a frequency value of the secondary uplink carrier frequency, or a unique identifier allocated for the secondary uplink carrier frequency by the system). The activation request message may be a physical layer message or a MAC PDU.

In step 203, the UE performs the state switching.

In this step, the UE performs a corresponding state switching operation on the secondary uplink carrier serving cell according to the message received in step 202.

If the UE receives the deactivation request message, the UE acquires a corresponding secondary uplink carrier serving cell according to the identifier of the secondary uplink carrier frequency which the secondary uplink carrier serving cell uses, where the identifier is carried in the activation request message, and the UE stops sending the uplink data on the secondary uplink carrier serving cell, for example, the UE stops sending the uplink data and stops the transmission on the uplink dedicated physical control channel (DPCCH) on the secondary uplink carrier serving cell.

If the UE receives the activation request message, the UE acquires a corresponding secondary uplink carrier serving cell according to the identifier of the secondary uplink carrier frequency which the secondary uplink carrier serving cell uses, where the identifier is carried in the activation request message, and the UE starts to send the uplink data and starts the transmission on the uplink DPCCH on the secondary uplink carrier serving cell.

In step 204, the UE sends a state switching response message.

In this step, after performing the state switching on the secondary uplink carrier serving cell, the UE sends a state switching response message to the base station to notify the operation result to the base station.

A physical channel of the state switching response message sent by the UE may be an HS-DPCCH or one of other physical layer channels.

If the UE receives the deactivation request message in step 203, after performing the deactivating operation on the secondary uplink carrier serving cell, the UE sends a deactivation response message to the base station.

If the UE receives the activation request message in step 203, after performing the activating operation on the secondary uplink carrier cell, the UE sends an activation response message to the base station.

In step 205, the base station notifies the state of the secondary uplink carrier serving cell to the RNC.

In this step, the base station sends a state notification message to the RNC according to the state switching response received in step 204. The state notification message carries the state of the secondary uplink carrier serving cell.

In step 206, the RNC forwards the state of the secondary uplink carrier serving cell to other cells of a secondary carrier active set, which do not know state change of the secondary uplink carrier serving cell.

The cells working at the same carrier frequency of the base station form an active set. The secondary carrier active set is a set of cells which work at the secondary uplink carrier frequencies and are connected with the UE. The RNC delivers a control message to the UE. The control message carries identifiers of multiple cells, and indicates that measurement needs to be performed on the cells. After completing the measurement, the UE reports a measurement result to the RNC. According to the result, the RNC judges which cells may join in the secondary carrier active set of the UE, and selects a cell with optimal signal quality as the secondary uplink carrier serving cell. The RNC notifies the secondary carrier active set to the UE. Specifically, the RNC notifies the UE of secondary uplink carrier frequencies of the secondary carrier active set and cells included in the secondary carrier active set. When the UE establishes connection with the base station through the secondary uplink carrier cell, the UE actually establishes connection with all cells in the secondary carrier active set. All uplink cells in the secondary carrier active set may bear uplink data or bear synchronous control signals of the uplink DPCCH. After the secondary uplink carrier serving cell is deactivated, the UE stops transmitting the uplink DPCCH at the cells in the secondary carrier active set. When all cells in the secondary carrier active set are synchronized, the signals of the DPCCH are not detected, it is considered that link synchronization between the cell and the UE fails. The failure in link synchronization may make a network side release the wireless link through which the cell is connected with the UE. In this way, the cell cannot act as the secondary uplink carrier serving cell to share the uplink data of the primary carrier cell.

In order to solve the problem aforementioned, in this step, the RNC sends the state notification message to notify the state of the secondary uplink carrier frequencies to all cells except the secondary uplink carrier serving cell in the secondary uplink carrier active set, and. If the state of the secondary uplink carrier serving cell is switched from the activated state to the deactivated state, after acquiring the current state of the secondary uplink carrier serving cell, all cells in the secondary carrier active set stop detecting the uplink DPCCH. In this way, the UE is not disconnected completely from the cells in the secondary carrier active set, and other cells except the secondary uplink carrier serving cell in the secondary carrier active set may be subsequently selected to perform the activating operation.

This step is optional. If the secondary uplink carrier serving cell is deactivated, and the RNC does not notify information indicating that the secondary uplink carrier serving cell is deactivated to other cells except the secondary uplink carrier serving cell in the secondary carrier active set, a cell in the secondary carrier active set reports a Radiolink Failure to the RNC when detecting that the link synchronization fails. However, because the RNC knows the state of the secondary uplink carrier serving cell, the RNC does not respond to the received Radiolink Failure, i.e., a corresponding link is not deleted, so that, the wireless link between the UE and the cells in the secondary carrier active set is also sustained.

In the method for managing uplink carrier frequencies according to this embodiment of this invention, the state switching decision indication is delivered through the RNC. The base station performs measurement and judgment according to the state switching decision indication. The base station determines a suitable secondary uplink carrier serving cell according to a measurement result, and instructs the UE to perform the activating operation on the secondary uplink carrier serving cell when dual-cell uplink collaboration is required; and the base station instructs the UE to perform the deactivating operation on the secondary uplink carrier serving cell when the secondary uplink carrier serving cell is not needed to assist in sending data. In this way, in a dual-cell uplink collaboration mode, the secondary uplink carrier serving cell is managed flexibly, and multi-cell HSUPA collaboration is used to transmit the uplink data. Furthermore, after the operation is completed, the state of the secondary uplink carrier serving cell is notified to the RNC, and the RNC notifies the state of the secondary uplink carrier serving cell to other cells except the secondary uplink carrier serving cell in the secondary carrier active set. As a result, synchronization of the cell state is achieved, the amount of data processed by the RNC is reduced, a valid link is maintained, and network resources are saved; time needed for the base station to complete the measurement and judgment to obtain uplink data information is short, and the efficiency of the system is high.

A third embodiment of the present invention is provided in the following with reference to an accompanying drawing.

Figure 3:
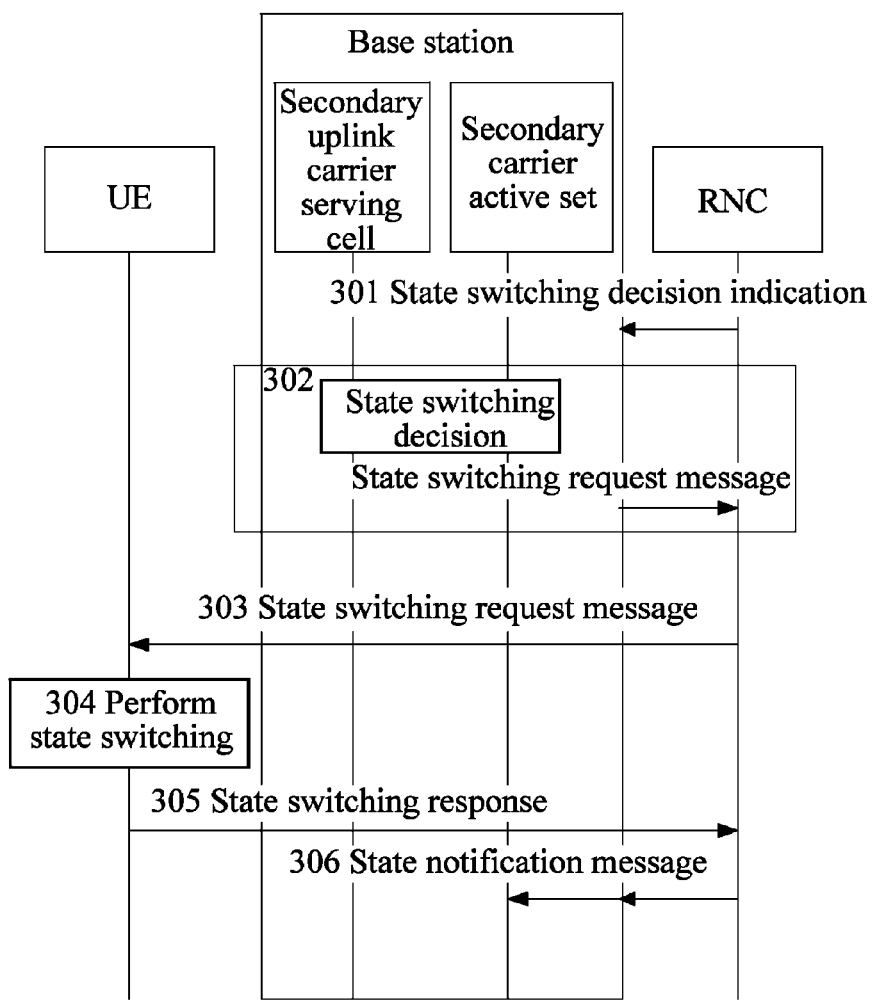
FIG. 3 is a flow chart of a method for managing uplink carrier frequencies according to a third embodiment of the present invention.

As shown in FIG. 3, the method for managing uplink carrier frequencies according to this embodiment includes the following steps.

In step 301, a base station receives a state switching decision indication.

When the base station is switched on and joins into a network, an RNC sends to the base station the state switching decision indication which instructs the base station to perform measurement and judgment according to the state switching decision indication and implement activation and deactivation operations of a secondary uplink carrier serving cell. The secondary uplink carrier serving cell in this embodiment specifically refers to a secondary carrier E-DCH serving cell.

In this step, the base station receives the state switching decision indication. The state switching decision indication carries decision control. The decision control is as described in the embodiment shown in FIG. 2, and will not be described in detail here.

In step 302, the base station performs state switching decision, and sends a state switching request message to the RNC.

In this step, the base station performs the state switching decision according to the state switching decision indication received in step 301. A specific process that the base station performs the state switching decision is as described in the embodiment shown in FIG. 2, and will not be described in detail here.

If the base station decides to perform a deactivation operation on the secondary uplink carrier serving cell, a deactivation request message is sent to the RNC. The deactivation request message carries an identifier of the secondary uplink carrier frequency which the secondary uplink carrier serving cell uses (the identifier may be a frequency value of the secondary uplink carrier frequency, or a unique identifier allocated for the secondary uplink carrier frequency by the system). The deactivation request message may be a Radio Resource Control (RRC) protocol message.

If the base station decides to perform an activation operation on the secondary carrier serving cell, an activation request message is sent to the RNC. The activation request message carries an identifier of the secondary uplink carrier frequency which the selected secondary uplink carrier serving cell uses (the identifier may be a frequency value of the secondary uplink carrier frequency, or a unique identifier allocated for the secondary uplink carrier frequency by the system). The activation request message may be a physical layer message or a MAC PDU.

In step 303, the RNC forwards the state switching request message to the UE.

In this step, the RNC forwards the activation request message or deactivation request message to the related UE through the RRC message.

In step 304, the UE performs state switching.

In this step, the UE performs a corresponding state switching operation on the secondary uplink carrier serving cell according to the message received in step 303. The UE performs the state switching operation with a specific process described in the embodiment shown in FIG. 2, and the specific process will not be described in detail here.

In step 305, the UE sends a state switching response message.

In this step, after performing the state switching operation on the secondary uplink carrier serving cell, the UE sends the state switching response message to the RNC to notify the operation result to the RNC.

The state switching response message sent by the UE is borne in the RRC message.

If the UE receives the deactivation request message in step 304, after performing the deactivating operation on the secondary uplink carrier serving cell, the UE sends a deactivation response message to the RNC.

If the UE receives the activation request message in step 304, after performing the activating operation on the secondary uplink carrier serving cell, the UE sends an activation response message to the RNC.

In step 306, the RNC forwards the state of the secondary uplink carrier serving cell to other cells, which do not learn the message that the state of the secondary uplink carrier serving cell changes, in a secondary carrier active set.

This step is an optional step. After receiving the state notification message, the base station forwards the state notification message to all other cells in the secondary carrier active set.

If the UE performs the deactivating operation on the secondary uplink carrier serving cell, all cells in the secondary carrier active set stop synchronous detection of an uplink DPCCH. If the UE performs the activating operation on the secondary uplink carrier serving cell, all cells in the secondary carrier active set initiate synchronous detection of the DPCCH.

This step ensures that the wireless link between the UE and the cells in the secondary carrier active set is sustained, and a Radiolink Failure caused by link failure is not reported to the RNC.

This step is an optional step. If the RNC does not notify other cells except the secondary uplink carrier serving cell in the secondary carrier active set after the secondary uplink carrier serving cell is deactivated, a cell in the secondary carrier active set reports the Radiolink Failure to the RNC when detecting that synchronization fails. However, because the RNC knows the state of the secondary uplink carrier serving cell, the RNC does not respond to the received Radiolink Failure, i.e., the corresponding link is not deleted, so that, the wireless link between the UE and the cells in the secondary carrier active set is also sustained.

In the method for managing uplink carrier frequencies according to this embodiment, the state switching decision indication is delivered by the RNC. The base station performs measurement and judgment according to the state switching decision indication. The base station selects a suitable secondary uplink carrier serving cell according to a measurement result, and instructs the UE to perform the activating operation on the cell when dual-cell uplink collaboration is required; and the base station instructs the UE to perform the deactivating operation on the secondary uplink carrier serving cell when the secondary uplink carrier serving cell is not needed to assist in sending data. In this way, in a dual-cell uplink collaboration mode, the secondary uplink carrier serving cell is managed flexibly, and multi-cell HSUPA collaboration is used to transmit the uplink data. Furthermore, after the operation is completed, the state of the secondary uplink carrier serving cell is notified to the RNC, and the RNC notifies the state of the secondary uplink carrier serving cell to all cells except the secondary uplink carrier serving cell in the secondary carrier active set. Therefore, synchronization of the cell state is achieved, the amount of data processed by the RNC is reduced, a valid link is maintained, and network resources are saved; time needed for the base station to complete the measurement and the judgment to obtain uplink information is short, and the efficiency of the system efficiency is high.

A fourth embodiment of the present invention is provided in the following with reference to an accompanying drawing.

Figure 4:
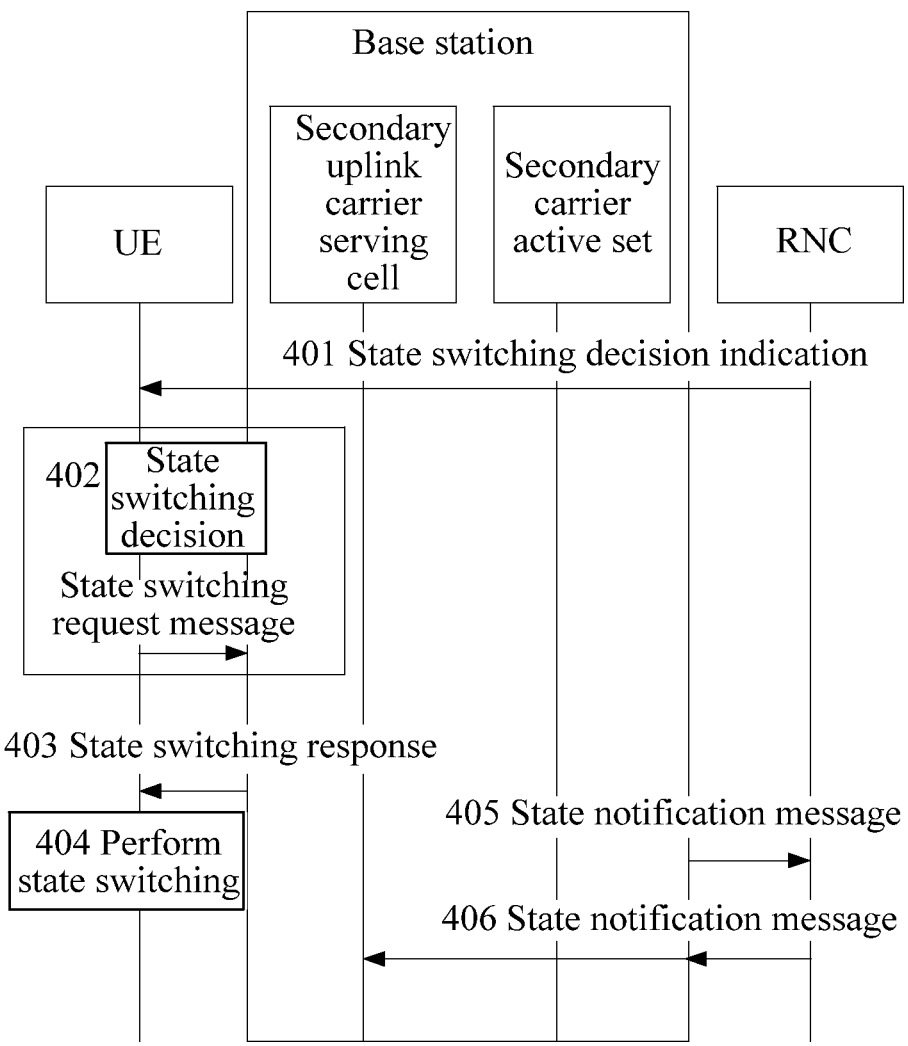
FIG. 4 is a flow chart of a method for managing uplink carrier frequencies according to a fourth embodiment of the present invention.

As shown in FIG. 4, the method for managing uplink carrier frequencies according to this embodiment includes the following steps.

In step 401, a UE receives a state switching decision indication.

When the UE joins into a network through a base station, an RNC sends to the UE the state switching decision indication which instructs the UE to perform measurement and judgment according to the state switching decision indication and implement activation and deactivation operations of a secondary uplink carrier serving cell. The secondary uplink carrier serving cell in this embodiment specifically refers to a secondary carrier E-DCH cell.

In this step, the UE receives the state switching decision indication. The state switching decision indication carries decision control. The decision control is as described in the embodiment shown in FIG. 2, and will not be described in detail here.

In step 402, the UE performs state switching decision.

In this step, the UE measures a related decision object according to the state switching decision indication received in step 401, and compares the measurement result with the decision parameter to determine whether it is needed to activate the secondary uplink carrier serving cell. A specific process that the UE performs the state switching decision is similar to a process that the base station performs the state switching decision described in the embodiment shown in FIG. 2, and will not be described in detail here.

If the UE decides to perform the deactivating operation on the secondary uplink carrier serving cell, a deactivation request message is sent to the base station for permitting the UE to stop sending uplink data through the secondary uplink carrier serving cell, where the deactivation request message carries an identifier of the secondary uplink carrier frequency which the secondary uplink carrier serving cell uses (the identifier may be a frequency value of the secondary uplink carrier frequency, or a unique identifier allocated for the secondary uplink carrier frequency by the system). The deactivation request message may be a physical layer message, such as an E-DPCCH, or other physical layer channels, or may be a MAC PDU.

If the UE decides to perform the activating operation on the secondary uplink carrier serving cell, an activation request message is sent to the base station. The activation request message carries an identifier of the secondary uplink carrier frequency which the selected secondary uplink carrier serving cell uses (the identifier may be a frequency value of the secondary uplink carrier frequency, or a unique identifier allocated for the secondary uplink carrier frequency by the system). The activation request message may be a physical layer message or a MAC PDU.

In step 403, the base station sends a state switching response to the UE.

In this step, the state switching response may be borne on a physical channel, e.g., Enhanced Dedicated Channel Hybrid Automatic Repeat Request Indicator Channel (E-HICH), or an Enhanced Relative Grant Channel (E-RGCH) or an enhanced Absolute Grant Channel (E-AGCH), or other physical layer channels.

In step 404, the UE performs state switching.

In this step, according to a decision result in step 402, after receiving the state switching response, the UE performs a corresponding state switching operation on the secondary uplink carrier serving cell.

If the UE receives a response of the deactivation request message, the UE acquires a corresponding secondary uplink carrier serving cell according to the identifier of the secondary uplink carrier frequency which the secondary uplink carrier serving cell uses, where the identifier is carried in the deactivation request message, and the UE stops sending the uplink data on the secondary uplink carrier serving cell, for example, stops sending the uplink data on the secondary uplink carrier serving cell and stops the transmission on the uplink DPCCH.

If the UE receives a response of the activation request message, the UE acquires a corresponding secondary uplink carrier serving cell according to the identifier of the secondary uplink carrier frequency which the secondary uplink carrier serving cell uses, where the identifier is carried in the activation request message, and the UE starts to send the uplink data on the secondary uplink carrier serving cell and starts the transmission on the uplink DPCCH.

In step 405, the base station notifies the state of the secondary uplink carrier serving cell to the RNC.

In this step, the base station sends the state notification message to the RNC. The state notification message carries the state of the secondary uplink carrier serving cell.

In step 406, the RNC forwards the state of the secondary uplink carrier serving cell to other cells in a secondary carrier active set that do not learn that state of the secondary uplink carrier serving cell changes.

When the UE establishes connection with the base station through the secondary uplink carrier serving cell, the UE actually establishes connection with all cells in the secondary carrier active set. The UE only selects a cell with optimal signal quality as the secondary uplink carrier serving cell, and sends the uplink data through all uplink cells in the secondary carrier active set. However, the base station only receives the uplink data sent through the secondary uplink carrier serving cell. Link detection is performed on all cells in the secondary carrier active set, which is specifically: synchronously detecting the uplink DPCCH. When the base station detects that a certain link is disconnected, the base station sends a Radiolink Failure to the RNC to indicate that this link is disconnected.

When the UE deactivates the secondary uplink carrier serving cell, the uplink DPCCH connected with the cell in the secondary carrier active set is no longer detected. The UE is not disconnected from the cells in the secondary carrier active set completely, so that other cells may be subsequently selected to perform the activating operation.

This step is an optional step. After receiving the state notification message, the base station forwards the state notification message to all other cells of the secondary carrier active set.

If the UE performs the deactivating operation on the secondary uplink carrier serving cell, all cells in the secondary carrier active set stop synchronous detection of the uplink DPCCH. If the UE performs the activating operation on the secondary uplink carrier serving cell, all cells in the secondary carrier active set start synchronous detection of the DPCCH.

This step ensures that the wireless link between the UE and the cells in the secondary carrier active set is sustained, and the Radiolink Failure caused by link failure is not reported to the RNC.

This step is an optional step. If the RNC does not notify other cells except the secondary uplink carrier serving cell in the secondary carrier active set after the secondary uplink carrier serving cell is deactivated, a cell in the secondary carrier active set reports the Radiolink Failure to the RNC when detecting that synchronization fails. However, because the RNC knows the state of the secondary uplink carrier serving cell, the RNC does not respond to the received Radiolink Failure, i.e., a corresponding link is not deleted, so that, the wireless link between the UE and the cells in the secondary carrier active set is also sustained.

In the method for managing uplink carrier frequencies according to this embodiment, the state switching decision indication is delivered by the RNC. The UE performs measurement and judgment according to the state switching decision indication. The UE selects a suitable secondary uplink carrier serving cell according to a measurement result, and performs the activating operation on the cell when dual-cell uplink collaboration is required; and the UE performs the deactivation operation on the secondary uplink carrier serving cell when the secondary uplink carrier serving cell is not needed to assist in sending data. In this way, in a dual-cell uplink collaboration mode, the secondary uplink carrier serving cell is managed flexibly, and a problem that multi-cell HSUPA collaboration cannot be used to transmit the uplink data is solved. Furthermore, after the base station indicates the UE to perform the state switching operation, the base station notifies the state of the secondary uplink carrier serving cell to the RNC, and the RNC notifies the state of the secondary uplink carrier serving cell to other cells except the secondary uplink carrier serving cell in the secondary carrier active set. As a result, synchronization of the cell state is achieved, the amount of data processed by the RNC is reduced, a valid link is maintained, and network resources are saved; time needed for the UE to complete the measurement and the judgment to obtain uplink information is short, and the system efficiency is high.

A fifth embodiment of the present invention is provided in the following with reference to an accompanying drawing.

Figure 5:
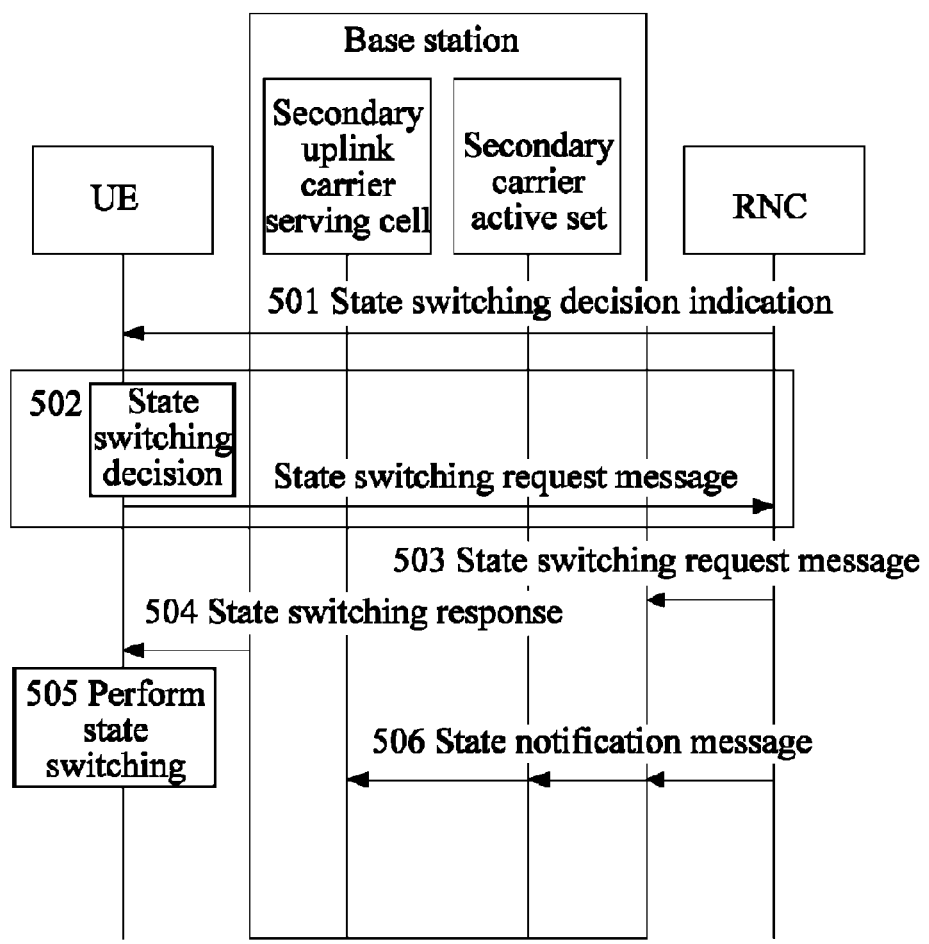
FIG. 5 is a flow chart of a method for managing uplink carrier frequencies according to a fifth embodiment of the present invention.

As shown in FIG. 5, the method for managing uplink carrier frequencies according to this embodiment includes the following steps.

In step 501, a UE receives a state switching decision indication.

When the UE joins into a network through a base station, an RNC sends to the UE the state switching decision indication which instructs the UE to perform measurement and judgement according to the state switching decision indication and implement activation and deactivation operations of secondary uplink of a secondary uplink carrier serving cell. The secondary uplink carrier serving cell in the embodiment of the present invention specifically refers to a secondary carrier E-DCH cell.

In this step, the base station receives the state switching decision indication. The state switching decision indication carries decision control. The decision control is as described in the embodiment shown in FIG. 2, and will not be described in detail here.

In step 502, the UE performs state switching decision, and sends a state switching request message to the RNC.

In this step, the UE measures a related decision object according to the state switching decision indication received in step 401, and compares the measurement result with the decision parameter to determine whether it is needed to activate the secondary uplink carrier serving cell. In this step, a specific process that the UE performs the state switching decision is similar to a process that the base station performs the state switching decision described in the embodiment shown in FIG. 2, and will not be described in detail here.

If the UE decides to perform the deactivating operation on the secondary uplink carrier serving cell, a deactivation request message is sent to the RNC for permitting the UE to stop sending uplink data through the secondary uplink carrier serving cell, where the deactivation request message carries an identifier of the secondary uplink carrier frequency which the secondary uplink carrier serving cell uses (the identifier may be a frequency value of the secondary uplink carrier frequency, or a unique identifier allocated for the secondary uplink carrier frequency by the system). The deactivation request message is borne in an RRC message, or may be borne in a MAC PDU.

If the UE decides to perform the activating operation on the secondary uplink carrier serving cell, an activation request message is sent to the RNC. The activation request message carries an identifier of the secondary uplink carrier frequency which the selected secondary uplink carrier serving cell uses (the identifier may a frequency value of the secondary uplink carrier frequency, or a unique identifier allocated for the secondary uplink carrier frequency by the system). The activation request message may be a physical layer message, or may be a MAC PDU.

In step 503, the RNC forwards the state switching request message to the base station.

In this step, the RNC forwards the activation request message or deactivation request message, which is received in step 502, to the base station.

Alternatively, the RNC may directly send a state switching response message to the UE, so as to trigger the UE to perform state switching on the secondary uplink carrier serving cell.

In step 504, the base station sends the state switching response message to the UE through a physical layer message.

In step 505, the UE performs the state switching.

In this step, the UE, according to a decision result in step 502, performs a corresponding state switching operation on the secondary uplink carrier serving cell after receiving the state switching response.

If the UE receives a deactivation response message, the UE stops sending the uplink data on the secondary uplink carrier serving cell, for example, stops sending the uplink data on the secondary uplink carrier serving cell and stops the transmission on the uplink DPCCH.

If the UE receives an activation response message, the UE, according to secondary uplink of a secondary uplink carrier identifier carried in the activation request message, starts to send the uplink data on the secondary uplink carrier serving cell and starts the transmission on the uplink DPCCH.

In step 506, the RNC forwards a state of the secondary uplink carrier serving cell to all cells in a secondary carrier active set.

When the UE establishes connection with the base station through the secondary uplink carrier serving cell, the UE actually establishes connection with all cells in the secondary carrier active set. The UE only selects a cell with optimal signal quality as the secondary uplink carrier serving cell, and sends the uplink data through all uplink cells in the secondary carrier active set. However, the base station only receives the uplink data sent through the secondary uplink carrier serving cell. Link detection is performed on all cells in the secondary carrier active set, which is specifically: synchronously detecting the uplink DPCCH. When the base station detects that synchronization of a certain link fails, the base station sends a Radiolink Failure to the RNC to indicate that the synchronization fails.

When the UE deactivates the secondary uplink carrier serving cell, the uplink DPCCH connected with the cell in the secondary carrier active set is no longer detected. The UE is not disconnected from the cells in the secondary carrier active set completely, so that other cells may be subsequently selected to perform the activating operation.

After receiving the state notification message, the base station forwards the state notification message to all other cells of the secondary carrier active set.

If the UE performs the deactivating operation on the secondary uplink carrier serving cell, all cells in the secondary carrier active set stop synchronous detection of the uplink DPCCH. If the UE performs the activating operation on the secondary uplink carrier serving cell, all cells in the secondary carrier active set start synchronous detection of the DPCCH.

This step ensures that the wireless link between the UE and the cells in the secondary carrier active set is sustained, and the Radiolink Failure caused by link failure is not reported to the RNC.

This step is an optional step. If the secondary uplink carrier serving cell is deactivated, and the RNC does not notify information indicating that the secondary uplink carrier serving cell is deactivated to other cells except the secondary uplink carrier serving cell in the secondary carrier active set, a cell in the secondary carrier active set reports a Radiolink Failure to the RNC when detecting that the link synchronization fails. However, because the RNC knows the state of the secondary uplink carrier serving cell, the received Radiolink Failure is discarded, i.e., a corresponding link is not deleted, so that, the wireless link between the UE and the cells in the secondary carrier active set is also sustained.

In the method for managing uplink carrier frequencies according to this embodiment, the state switching decision indication is delivered by the RNC. The UE performs measurement and judgment according to the state switching decision indication. The UE selects a suitable secondary uplink carrier serving cell according to a measurement result, and performs the activating operation on the cell when dual-cell uplink collaboration is required; and the UE performs the deactivation operation on the secondary uplink carrier serving cell when the secondary uplink carrier serving cell is not needed to assist in sending data. In this way, in a dual-cell uplink collaboration mode, the secondary uplink carrier serving cell is managed flexibly, and a problem that multi-cell HSUPA collaboration cannot be used to transmit the uplink data is solved. Furthermore, after the base station instructs the UE to perform the state switching operation, the base station notifies the state of the secondary uplink carrier serving cell to the RNC, and the RNC notifies the state of the secondary uplink carrier serving cell to other cells except the secondary uplink carrier serving cell in the secondary carrier active set. As a result, synchronization of the cell state is achieved, the amount of data processed by the RNC is reduced, a valid link is maintained, and network resources are saved; time needed for the UE to complete the measurement and the judgment to obtain uplink information is short, and the efficiency of the system is high.

A sixth embodiment of the present invention is provided in the following with reference to an accompanying drawing.

Figure 6:
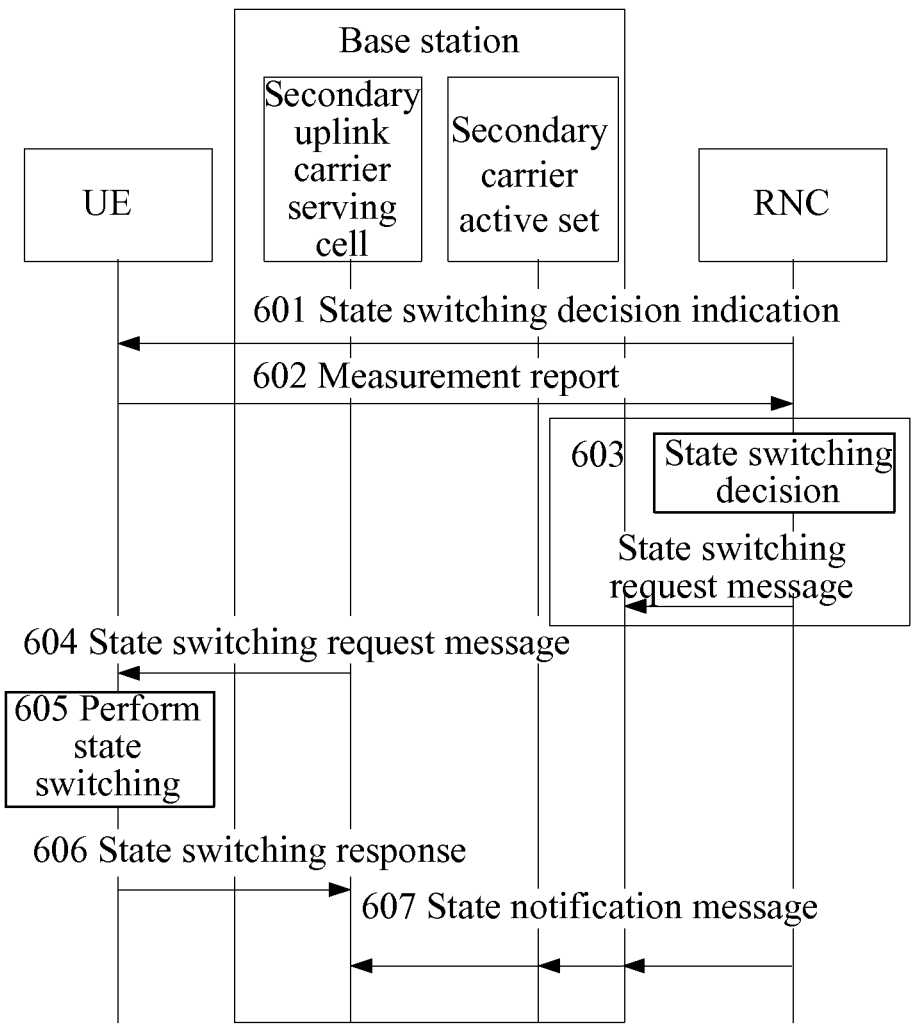
FIG. 6 is a flow chart of a method for managing uplink carrier frequencies according to a sixth embodiment of the present invention.

As shown in FIG. 6, the method for managing uplink carrier frequencies according to this embodiment includes the following steps.

In step 601, a UE receives a state switching decision indication.

When the UE joins into a network through a base station, an RNC sends the state switching decision indication to the UE, which instructs the UE to perform measurement and judgment according to the state switching decision indication and implement activation and deactivation operations of a secondary uplink carrier serving cell. The secondary uplink carrier serving cell in this embodiment is a secondary carrier E-DCH cell.

In the embodiment of the present invention, the state switching decision indication specifically refers to a measurement control message. In this step, the UE receives a measurement control. The measurement control carries multiple measurement objects, such as measurement of UE uplink transmit power, measurement of secondary carrier uplink wireless signal quality, and measurement of the amount of uplink data to be sent by the UE, and the measurement control may further include parameters such as a measurement time window, an event report threshold, and a report period. The measurement objects in the measurement control are independent of each other. The type of measurement object to be sent to a mobile phone is determined by a network side. Specific content of decision control is as described in the embodiment shown in FIG. 2, and will not be described in detail here.

In step 602, the UE sends a measurement report to the RNC.

In this step, the UE performs measurement according to the measurement control received in step 601, generates a measurement report on the basis of a measurement result, and sends the measurement report to the RNC.

In step 603, the RNC performs state switching decision.

In this step, the RNC stores a decision parameter for judging whether activation or deactivation is to be performed. In this step, according to the measurement report received in step 602, the RNC compares the measurement result with the decision parameter, so as to determine whether it is needed to activate the secondary uplink carrier serving cell.

If the UE is in a dual-cell uplink collaboration activated state, that is, the UE is connected with the base station through the primary carrier cell and the secondary uplink carrier serving cell simultaneously for sending the uplink data. In one measure window, as long as a measurement value of one control object satisfies the deactivation threshold, for example, when the amount of the uplink data transmitted by the secondary uplink carrier serving cell is very small, or when the signal quality of the secondary uplink carrier serving cell is poor and cannot satisfy the quality standard of the uplink signal, the RNC sends a deactivation request message carrying an identifier of the secondary uplink carrier frequency, which the secondary uplink carrier serving cell uses, to the base station (the identifier may be a frequency value of the secondary uplink carrier frequency, or a unique identifier allocated for the secondary uplink carrier frequency by the system), and requests the UE to stop sending uplink data through the secondary uplink carrier serving cell.

If the UE is in a dual-cell uplink collaboration deactivated state, the UE currently sends the uplink data only through the primary carrier cell. In one measure window, if the amount of the uplink data of the UE exceeds the activation threshold, and the signal quality of the secondary uplink carrier serving cell satisfies the quality standard of the uplink signal quality standard, the RNC sends an activation request message to the base station. The activation request message carries an identifier of the secondary uplink carrier frequency which the selected secondary uplink carrier serving cell uses (the identifier may be a frequency value of the secondary uplink carrier frequency, or a unique identifier allocated for the secondary uplink carrier frequency by the system). The activation request message may be a Node B Application Part (NBAP) message.

In step 604, the base station forwards a state switching request message to the UE.

In this step, the base station forwards the activation request message or the deactivation request message received in step 603 to the UE. The activation request message or the deactivation request message is borne on a physical layer channel.

In step 605, the UE performs the state switching.

In this step, after receiving the state switching request message, the UE performs a corresponding state switching operation on the secondary uplink carrier serving cell. A specific process that the UE performs the state switching is as described in the embodiment shown in FIG. 2, and will not be described in detail here.

If the UE receives the deactivation request message, the UE stops sending the uplink data on the secondary uplink carrier serving cell, for example, stops sending on the secondary carrier E-DCH and transmission on the uplink DPCCH.

If the UE receives the activation request message, the UE starts the sending of the E-DCH on the secondary uplink carrier serving cell and the transmission on the uplink DPCCH according to an identifier of the secondary uplink carrier frequency which a secondary uplink carrier serving cell uses, where the identifier is carried in the activation request message.

In step 606, the UE sends a state switching response message to the base station.

In this step, the UE sends the state switching response message to the base station through a physical layer message. If the UE performs the activating operation on the secondary uplink carrier serving cell, an activation response message is sent. If the UE performs the deactivating operation on the secondary uplink carrier serving cell, a deactivation response message is sent.

In step 607, the RNC forwards a state of the secondary uplink carrier serving cell to all cells in a secondary carrier active set.

When the UE establishes connection with the base station through the secondary uplink carrier serving cell, the UE actually establishes connection with all cells in the secondary carrier active set, and sends the uplink data through all uplink cells in the secondary carrier active set. However, the base station only receives the uplink data sent through the secondary uplink carrier serving cell. Link detection is performed on all cells in the secondary carrier active set, which is specifically: synchronously detecting the uplink DPCCH. When the base station detects that synchronization of a certain link fails, the base station sends a Radiolink Failure to the RNC to indicate that the synchronization fails.

When the UE deactivates the secondary uplink carrier serving cell, the uplink DPCCH connected with the cell in the secondary carrier active set is no longer detected. The UE is not disconnected from the cells in the secondary carrier active set completely, so that other cells except the secondary uplink carrier serving cell in the secondary carrier active set may be subsequently selected to perform the activating operation.

After receiving the state notification message, the base station forwards the state notification message to all other cells of the secondary carrier active set.

If the UE performs the deactivating operation on the secondary uplink carrier serving cell, all cells in the secondary carrier active set stop synchronous detection of the uplink DPCCH. If the UE performs the activating operation on the secondary uplink carrier serving cell, all cells in the secondary carrier active set start synchronous detection of the DPCCH.

This step ensures that the wireless link between the UE and the cells in the secondary carrier active set is sustained, and the Radiolink Failure caused by link failure is not reported to the RNC.

This step is an optional step. If the secondary uplink carrier serving cell is deactivated, and the RNC does not notify information indicating that the secondary uplink carrier serving cell is deactivated to other cells except the secondary uplink carrier serving cell in the secondary carrier active set, a cell in the secondary carrier active set reports a Radiolink Failure to the RNC when detecting that the link synchronization fails. However, because the RNC knows the state of the secondary uplink carrier serving cell, the RNC does not respond to the received Radiolink Failure, i.e., a corresponding link is not deleted, so that, the wireless link between the UE and the cells in the secondary carrier active set is also sustained.

In other embodiments of the present invention, the measurement control may also be sent to the base station through the RNC. An implementation process that the measurement control may also be sent to the base station through the RNC is similar to a process that the UE reports the measurement report described in this embodiment, and will not be described in detail here.

In the method for managing uplink carrier frequencies according to this embodiment, the RNC sends the measurement control to the UE, and the UE reports the measurement result for judging whether it is needed to activate the secondary uplink carrier serving cell. The RNC performs judgment according to the measurement result. The RNC selects a suitable secondary uplink carrier serving cell according to a measurement result, and instructs the UE to perform the activating operation on the cell when dual-cell uplink collaboration is required; and the RNC performs the deactivation operation on the secondary uplink carrier serving cell when the secondary uplink carrier serving cell is not needed to assist in sending data. In this way, in a dual-cell uplink collaboration mode, the UE is instructed to flexibly manage the secondary uplink carrier serving cell, and a problem that multi-cell HSUPA collaboration cannot be used to transmit the uplink data is solved. Furthermore, the state of the secondary uplink carrier serving cell is notified to other cells except the secondary uplink carrier serving cell in the secondary carrier active set. As a result, synchronization of the cell state is achieved, the amount of data processed by the RNC is reduced, a valid link is maintained, and network resources are saved.

A seventh embodiment of the present invention is provided in the following with reference to an accompanying drawing.

Figure 7:
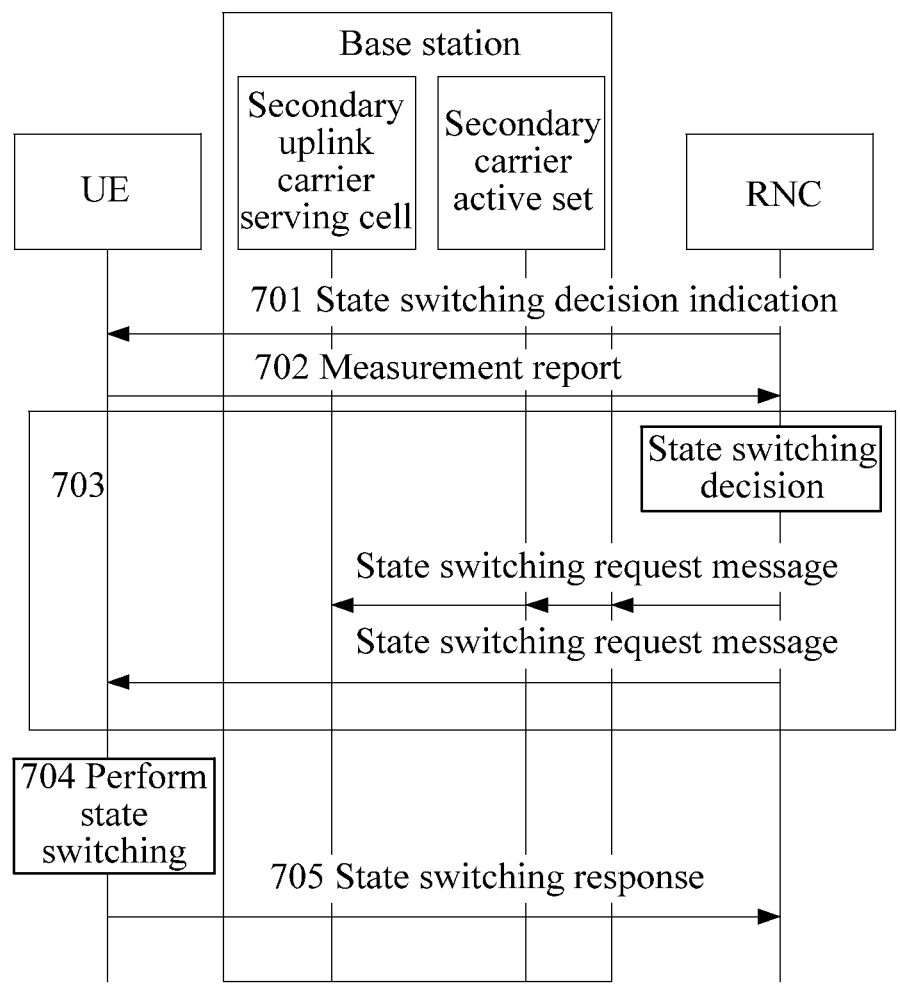
FIG. 7 is a flow chart of a method for managing uplink carrier frequencies according to a seven embodiment of the present invention.

In order to solve a problem that multi-cell HSUPA collaboration cannot be used to transmit uplink data, the method for managing uplink carrier frequencies according to the embodiment of the present invention, as shown in FIG. 7, includes the following steps.

In step 701, a UE receives a state switching decision indication.

When the UE joins into a network through a base station, an RNC sends to the UE the state switching decision indication which instructs the UE to perform measurement and judgment according to the state switching decision indication and implement activation and deactivation operations of a secondary uplink carrier serving cell. The secondary uplink carrier serving cell in this embodiment is a secondary carrier E-DCH cell.

In the embodiment of the present invention, the state switching decision indication specifically refers to a measurement control message. In this step, the UE receives a measurement control. The measurement control carries multiple measurement objects, such as measurement of UE uplink transmit power, measurement of secondary carrier uplink wireless signal quality, and measurement of the amount of uplink data to be sent by the UE, and may further include parameters such as a measurement time window, event report threshold, and report period. The measurement objects in the measurement control are independent of each other. The type of measurement object to be sent to a mobile phone is decided by a network side. Specific content of the measurement control is as described in the embodiment shown in FIG. 2, and will not be described in detail here.

In step 702, the UE sends a measurement report to the RNC.

In this step, the UE performs measurement according to the measurement control received in step 701, generates a measurement report on the basis of a measurement result, and sends the measurement report to the RNC.

In step 703, the RNC performs state switching decision.

The RNC stores a decision parameter required for judging whether activation or deactivation is to be performed. In this step, according to the measurement report received in step 702, the RNC compares the measurement result with the decision parameter, so as to determine whether it is needed to activate the secondary uplink carrier serving cell.

If the UE is in a dual-cell uplink collaboration activated state, that is, the UE is connected with the base station through the primary carrier cell and the secondary uplink carrier serving cell simultaneously for sending the uplink data. In one measure window, as long as a measurement value of one control object satisfies the deactivation threshold, for example, when the amount of the uplink data transmitted by the secondary uplink carrier serving cell is very small, or when the signal quality of the secondary uplink carrier serving cell is poor and cannot satisfy the quality standard of the uplink signal, the RNC sends to the base station and the UE a deactivation request message carrying an identifier of the secondary uplink carrier frequency which the secondary uplink carrier serving cell uses (the identifier may be a frequency value of the secondary uplink carrier frequency, or a unique identifier allocated for the secondary uplink carrier frequency by the system), and requests the UE to stop sending uplink data through the secondary uplink carrier serving cell.

If the UE is in a dual-cell uplink collaboration deactivated state, the UE currently sends the uplink data only through the primary carrier cell. In one measure window, if the amount of the uplink data of the UE is beyond the activation threshold, and the signal quality of the secondary uplink carrier serving cell satisfies the signal quality standard, the RNC sends an activation request message to the base station and the UE. The activation request message carries an identifier of the secondary uplink carrier frequency which the selected secondary uplink carrier serving cell uses (the identifier may be a frequency value of the secondary uplink carrier frequency, or a unique identifier allocated for the secondary uplink carrier frequency by the system). The activation request message may be a physical layer message or a MAC PDU.

In step 704, the UE performs state switching.

In this step, the UE performs a corresponding state switching operation on the secondary uplink carrier serving cell according to the state switching request received in step 703.

If the UE receives the deactivation request message, the UE stops sending the uplink data on the secondary uplink carrier serving cell, for example, stops the sending on the secondary carrier E-DCH and the transmission on the uplink DPCCH.

If the UE receives the activation request message, according to a secondary uplink carrier identifier carried in the activation request message, the UE starts the sending of E-DCH on the secondary uplink carrier serving cell and the transmission on the uplink DPCCH.

In step 705, the UE sends a state switching response to the RNC.

In this embodiment, the measurement control may also be sent to the base station through the RNC. An implementation process that the measurement control may also be sent to the base station through the RNC is similar to a process that the mobile phone reports the measurement report described in this embodiment, and will not be described in detail here.

In the method for managing uplink carrier frequencies according to this embodiment, the RNC sends the measurement control to the UE, and the UE reports the measurement result required for judging whether it is needed to activate the secondary uplink carrier serving cell. The RNC performs judgment according to the measurement result. The RNC selects a suitable secondary uplink carrier serving cell according to the measurement result, and instructs the UE to perform the activating operation on the cell when dual-cell uplink collaboration is required; and the RNC performs the deactivation operation on the secondary uplink carrier serving cell when the secondary uplink carrier serving cell is not needed to assist in sending data. In this way, in a dual-cell uplink collaboration mode, the UE is instructed to flexibly manage the secondary uplink carrier serving cell, and a problem that multi-cell HSUPA collaboration cannot be used to transmit the uplink data is solved. Furthermore, the state of the secondary uplink carrier serving cell is notified to other cells except the secondary uplink carrier serving cell in the secondary carrier active set. As a result, synchronization of the cell state is achieved, the amount of data processed by the RNC is reduced, a valid link is maintained, and network resources are saved.

An eighth embodiment of the present invention is provided in the following with reference to an accompanying drawing.

Figure 8:
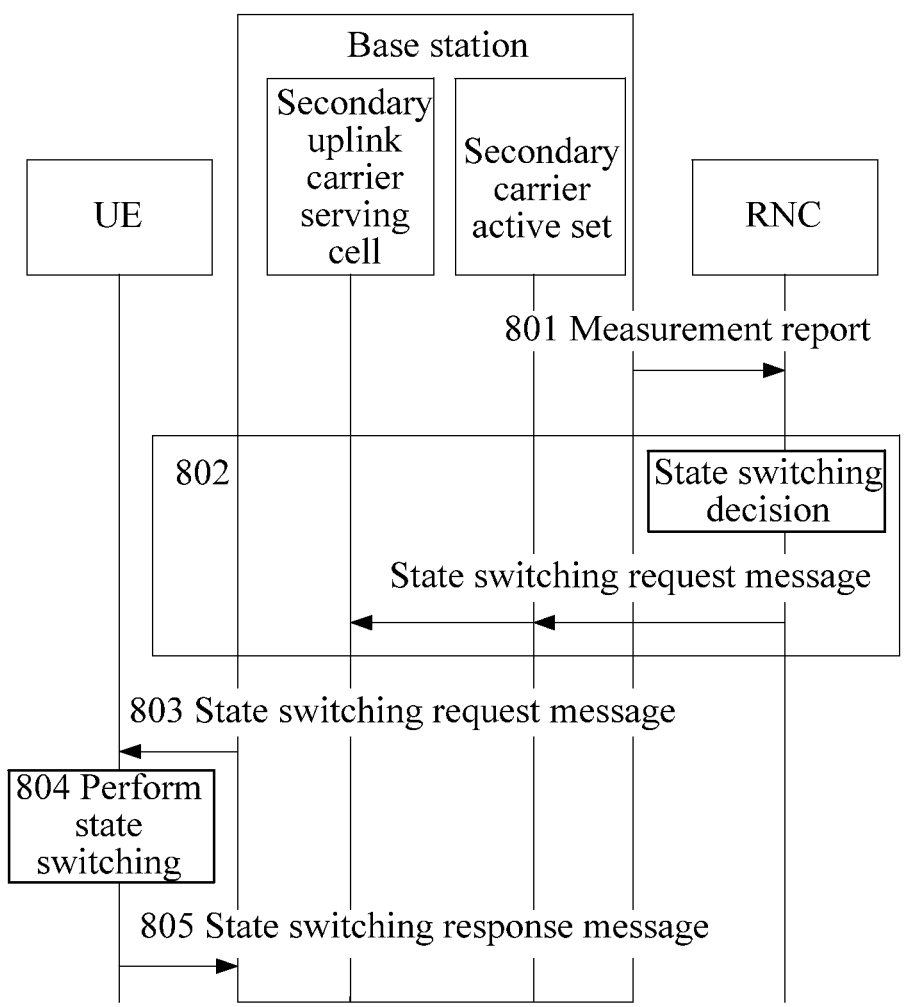
FIG. 8 is a flow chart of a method for managing uplink carrier frequencies according to an eighth embodiment of the present invention.

As shown in FIG. 8, the method for managing uplink carrier frequencies according to this embodiment includes the following steps.

In step 801, a base station sends a measurement report to an RNC.

In this step, the base station sends the measurement report to the RNC. The measurement report may be sent to the RNC through an NBAP message or Frame Protocol (FP) frame. The measurement report can include information such as measurement of UE uplink transmit power, measurement of uplink wireless signal quality, measurement of uplink carrier load, buffered state of UE uplink data or amount of data to be sent.

In step 802, the RNC performs state switching decision.

In this embodiment, the RNC stores a decision parameter for judging whether activation or deactivation is to be performed. According to the measurement report received in step 801, the RNC compares the measurement result with the decision parameter, so as to determine whether it is needed to activate or deactivate the secondary uplink carrier serving cell, and sends a state switching request message to the base station according to a judgment result.

If the UE is in a dual-cell uplink collaboration activated state, that is, the UE is connected with the base station through the primary carrier cell and the secondary uplink carrier serving cell simultaneously for sending the uplink data. In one measure window, as long as a measurement value of one control object satisfies the deactivation threshold, for example, when the amount of the uplink data is very small, or when the signal quality of the secondary uplink carrier serving cell is poor and cannot satisfy the quality standard of the uplink signal, the RNC sends a deactivation request message to all base stations in a secondary carrier active set of the UE, and requests the UE to stop sending uplink data through the secondary uplink carrier serving cell.

If the UE is in a dual-cell uplink collaboration deactivated state, the UE currently sends the uplink data only through the primary carrier cell. In one measure window, if the amount of the uplink data of the UE exceeds the activation threshold, and the signal quality of the secondary uplink carrier serving cell satisfies carrier load standard (for example, the signal quality satisfies the quality standard of the uplink signal), the RNC sends an activation request message to the base station. The activation request message may be an NBAP message or FP frame.

After receiving the deactivation request message, a secondary uplink carrier non-serving cell in the secondary carrier active set stops synchronously detecting an uplink DPCCH and receiving data. The deactivation request message may be an NBAP message or FP frame.

The step that the RNC sends the deactivation request message to a non-serving cell in the secondary carrier active set is an optional step. If the secondary uplink carrier serving cell is deactivated, and the RNC does not notify information indicating that the secondary uplink carrier serving cell is deactivated to other cells except the secondary uplink carrier serving cell in the secondary carrier active set, a cell in the secondary carrier active set reports a Radiolink Failure to the RNC when detecting that the link synchronization fails. However, because the RNC knows the state of the secondary uplink carrier serving cell, the RNC does not respond to the received Radiolink Failure, i.e., a corresponding link is not deleted, so that, the wireless link between the UE and the cells in the secondary carrier active set is also sustained.

In step 803, the base station forwards a state switching request message to the UE.

In this step, the base station forwards the activation request message or the deactivation request message received in step 802 to the UE. The activation request message or the deactivation request message is borne on a physical layer channel, such as a High Speed Shared Control Channel (HS-SCCH).

In step 804, the UE performs the state switching.

In this step, according to the state switching request message received in step 803, the UE performs a corresponding state switching operation on the secondary uplink carrier serving cell.

If the UE receives the deactivation request message, the UE stops sending the uplink data on the secondary uplink carrier serving cell, for example, stops the sending on the secondary carrier E-DCH and the transmission on the uplink DPCCH.

If the UE receives the activation request message, the UE starts the sending of E-DCH on the secondary uplink carrier serving cell and the transmission on the uplink DPCCH.

In step 805, the UE sends a state switching response message to the base station.

In this step, the UE sends the state switching response message to the base station through a physical layer message, which indicates that a corresponding operation is performed according to the state switching message sent by the base station.

Additionally, if the RNC finds that the primary carrier cell satisfies a deactivation condition (for example, signal quality cannot meet the requirements for normal communication) when performing the state switching decision in step 802, the RNC makes a reconfiguration decision and reconfigures the primary carrier cell and the secondary uplink carrier serving cell for the UE, or alternatively switches the UE from a dual-cell collaboration state to a single carrier mode.

The sequence of specific operations in steps 804 and 805 is not limited, and the two steps may be performed simultaneously. Also, switching may firstly be performed, and the response is sent after the switching is completed. Alternatively, the response is returned once the state switching message is received, and then the switching is performed. The sequence is not limited in the present invention.

In the method for managing uplink carrier frequencies according to this embodiment, the measurement control is sent to the UE. The RNC judges whether it is needed to perform the state switching according to the measurement report sent by the base station and information of the secondary uplink carrier serving cell used by the UE. The RNC selects a suitable secondary uplink carrier serving cell according to a measurement result, and instructs the UE to perform the activating operation on the cell when dual-cell uplink collaboration is required; and the RNC performs the deactivation operation on the secondary uplink carrier serving cell when the secondary uplink carrier serving cell is not needed to assist in sending data. In this way, in a dual-cell uplink collaboration mode, the UE is instructed to flexibly manage the secondary uplink carrier serving cell. In this embodiment, further, the state of the secondary uplink carrier serving cell is notified to other cells except the secondary uplink carrier serving cell in the secondary carrier active set. As a result, synchronization of the cell state is achieved, the amount of data processed by the RNC is reduced, a valid link is maintained, and network resources are saved. In this embodiment, when the primary carrier cell satisfies the deactivation condition, a reconfiguration operation is performed on the UE, and a new primary carrier cell and a new secondary uplink carrier serving cell are specified. In this way, information transmission quality is further improved.

A ninth embodiment of the present invention is provided in the following with reference to an accompanying drawing.

Figure 9:
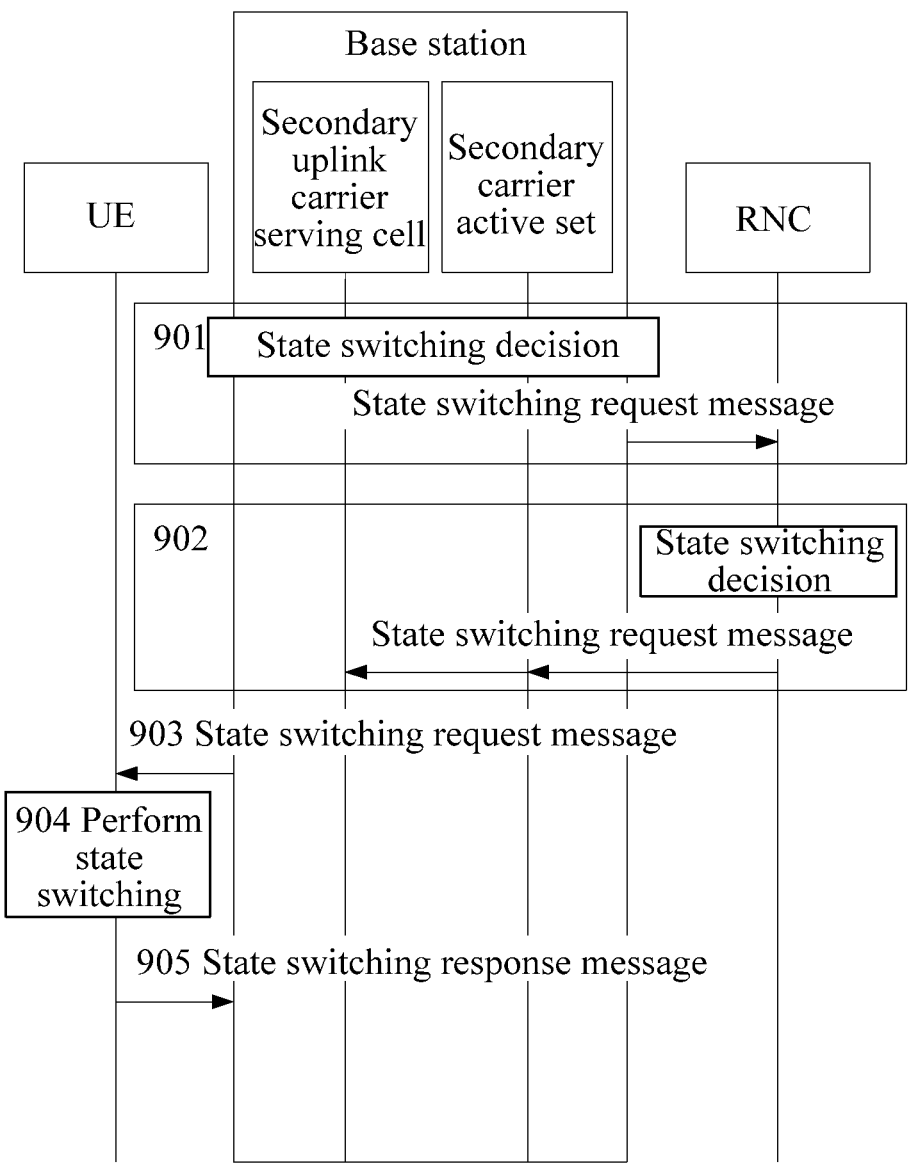
FIG. 9 is a flow chart of a method for managing uplink carrier frequencies according to a ninth embodiment of the present invention.

As shown in FIG. 9, the method for managing uplink carrier frequencies according to this embodiment includes the following steps.

In step 901, a base station performs state switching decision.

In this step, the base station may judge whether it is needed to perform state switching according to a measurement report sent by a UE and decision information such as cell-level uplink load information on the base station. The decision information may include information such as measurement of UE uplink transmit power, measurement of uplink wireless signal quality, measurement of uplink carrier load, buffered state of UE uplink data, or amount of data to be sent.

In this embodiment, the base station stores a decision parameter required for judging whether activation or deactivation is to be performed. The base station compares a measurement result carried in the measurement report and the cell-level uplink load information on the base station with the decision parameter, so as to determine whether it is needed to activate the secondary uplink carrier serving cell, and sends a state switching request message to the RNC according to a judgment result. A specific process that the base station performs the state switching decision is as described in the embodiment shown in FIG. 2, and will not be described in detail here.

If the base station decides to perform a deactivation operation on the secondary carrier serving cell, a deactivation request message is sent to the RNC for requesting the RNC to perform the state switching decision, and requesting the UE to stop sending uplink data through the secondary uplink carrier serving cell.

If the base station decides that it is needed to perform an activation operation on the secondary carrier serving cell, the deactivation request message is sent to the RNC to request the RNC to perform the state switching decision.

The activation request message and the deactivation request message may be an NBAP message or FP frame.

In step 902, the RNC performs the state switching decision.

In this step, after receiving the state switching request message sent by the base station in step 1801, the RNC performs the state switching decision according to related information of the UE on the current RNC, such as active set information, and cell uplink load information. The RNC may perform the state switching decision according to the received state switching request message sent by the base station and active set information of the UE. The RNC sends a decision result in a manner of the activation request message or deactivation request message to a serving base station or all cells in the secondary carrier active set of the UE, and the specific process is as described in step 802 in the eighth embodiment of the present invention.

Steps 903 to 905 in the embodiment of the present invention are basically the same as steps 803 to 805 in the eighth embodiment of the present invention, and will not be described in detail here.

Additionally, if the RNC finds that the primary carrier cell satisfies the deactivation condition when the RNC performs the state switching decision in step 902, the RNC makes a reconfiguration decision and reconfigures the primary carrier cell and the secondary uplink carrier serving cell for the UE, or alternatively switches the UE from a dual-cell collaboration state to a single carrier mode.

In the method for managing uplink carrier frequencies according to this embodiment, the base station triggers the state switching decision. The RNC judges whether it is needed to perform the state switching according to the state switching request message sent by the base station and active set information of the UE. The RNC selects a suitable secondary uplink carrier serving cell according to a measurement result, and instructs the UE to perform the activating operation on the cell when dual-cell uplink collaboration is required; and the RNC performs the deactivation operation on the secondary uplink carrier serving cell when the secondary uplink carrier serving cell is not needed to assist in sending data. In this way, in a dual-cell uplink collaboration mode, the UE is instructed to flexibly manage the secondary uplink carrier serving cell. In this embodiment, when the primary carrier cell satisfies the deactivation condition, a reconfiguration operation may be further performed on the UE, and a new primary carrier cell and a new secondary uplink carrier serving cell are specified. As a result, information transmission quality is further improved.

A tenth embodiment of the present invention is provided in detail in the following with reference to an accompanying drawing.

Figure 10:
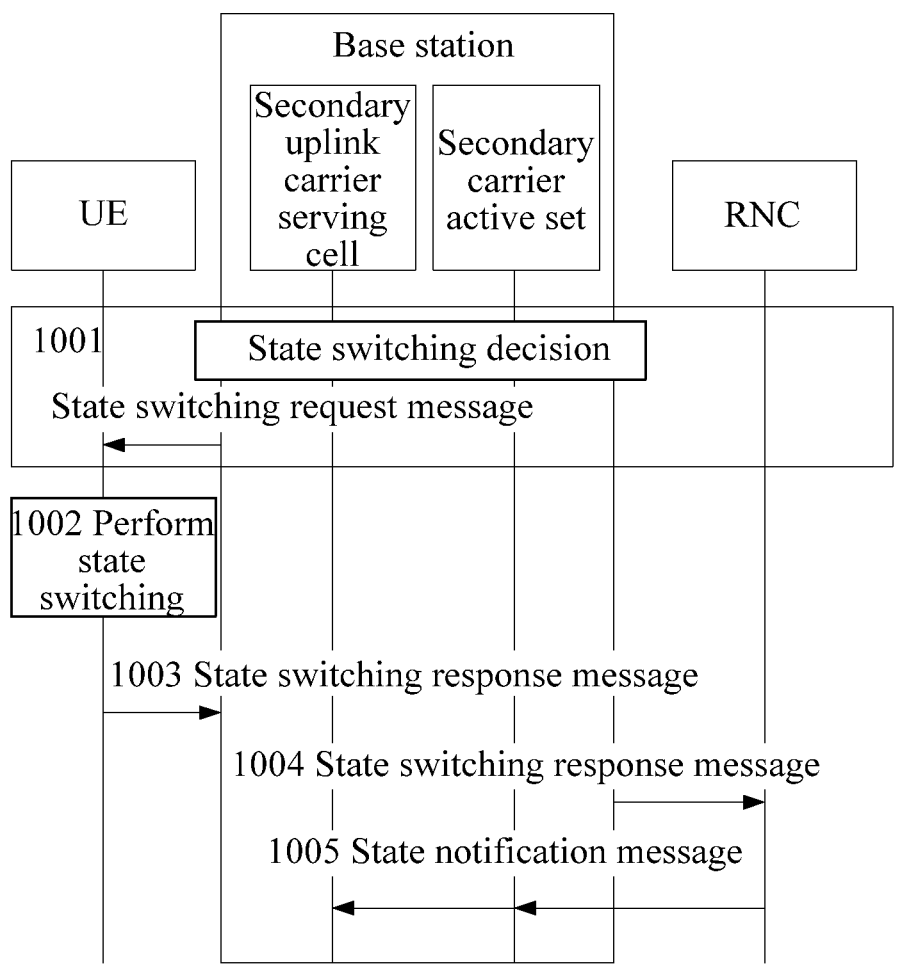
FIG. 10 is a flow chart of a method for managing uplink carrier frequencies according to a tenth embodiment of the present invention.

As shown in FIG. 10, the method for managing uplink carrier frequencies according to this embodiment includes the following steps.

In step 1001, a base station performs state switching decision.

In this step, the base station performs the state switching decision according to a measurement report sent by a UE, where the measurement report includes information for performing the state switching decision, such as scheduling information of a primary carrier cell and a secondary carrier cell, current cell load, and signal quality.

If the base station judges that it is needed to perform a deactivation operation on the secondary carrier serving cell, a deactivation request message is sent to the UE. If the base station judges that it is needed to perform an activation operation on the secondary carrier serving cell, an activation request message is sent to the UE.

The activation request message and the deactivation request message may be borne on a physical channel, such as an HS-SCCH channel.

Steps 1002 to 1003 in the embodiment of the present invention are basically the same as steps 804 to 805 in the eighth embodiment of the present invention, and will not be described in detail here.

If the activating operation is performed on the secondary carrier serving cell in the foregoing process, it is needed to notify the information indicating that the secondary carrier serving cell is in an activation state to the RNC and other cells in the secondary carrier active set. The detailed steps are as follows:

In step 1004, the base station forwards a state switching response message to the RNC.

In this step, the base station forwards the state switching response message, which is sent by the UE and is received in step 1003, to the RNC, so as to notify a current working state of the UE to the RNC.

The base station may send the state switching response message to the RNC through an NBAP (Node B Application Part) message or FP (Frame Protocol) frame.

In step 1005, the RNC forwards a state notification message to a secondary uplink carrier non-serving cell in the secondary carrier active set.

This step is an optional step. When the secondary uplink carrier cell is deactivated, the RNC sends the state notification message to the secondary uplink carrier non-serving cell in the secondary carrier active set of the UE. The state notification message may be an NBAP (Node B Application Part) message or FP (Frame Protocol) frame.

If the state switching response message is a deactivation response message, a secondary uplink carrier non-serving cell in the secondary carrier active set stops the synchronous detection of an uplink DPCCH and stops receiving data after receiving the deactivation response message.

Additionally, if the secondary uplink carrier serving cell is deactivated, and the RNC does not notify information indicating that the secondary uplink carrier serving cell is deactivated to other cells except the secondary uplink carrier serving cell in the secondary carrier active set, a cell in the secondary carrier active set reports a Radiolink Failure to the RNC when detecting that the link synchronization fails. However, because the RNC knows the state of the secondary uplink carrier serving cell, a response is not made to the received Radiolink Failure, i.e., a corresponding link is not deleted, so that, the wireless link between the UE and the secondary carrier active set cell is also sustained.

In the method for managing uplink carrier frequencies according to this embodiment, the base station judges whether it is needed to activate the secondary uplink carrier serving cell according to the measurement report sent by the UE. The base station selects a suitable secondary uplink carrier serving cell according to a measurement result, and instructs the UE to perform the activating operation on the cell when dual-cell uplink collaboration is required; and the base station performs the deactivation operation on the secondary uplink carrier serving cell when the secondary uplink carrier serving cell is not needed to assist in sending data. In this way, in a dual-cell uplink collaboration mode, the UE is instructed to flexibly manage the secondary uplink carrier serving cell. In this embodiment, the state of the secondary uplink carrier serving cell is notified to other cells except the secondary uplink carrier serving cell in the secondary carrier active set. As a result, synchronization of the cell state is achieved, the amount of data processed by the RNC is reduced, a valid link is maintained, and network resources are saved.

Figure 11:
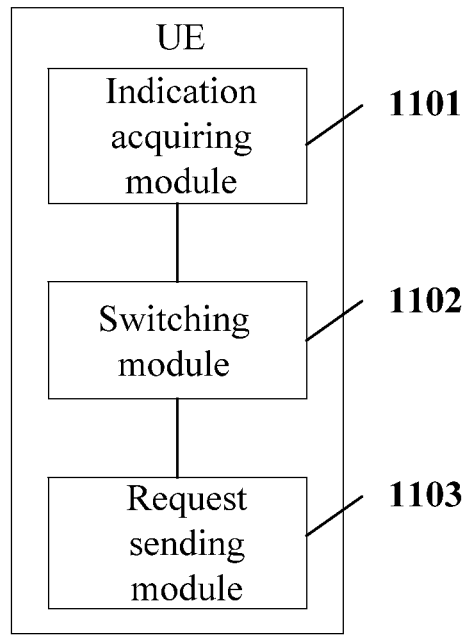
FIG. 11 is a schematic diagram of an internal structure of a UE according to an embodiment of the present invention.

FIG. 11 is a schematic diagram of an internal structure of a UE according to an embodiment of the present invention. As shown in FIG. 11, the UE includes an indication acquiring module 1101, switching module 1102 and a request sending module 1103.

The indication acquiring module 1101 is configured to acquire a state switching decision indication of secondary uplink carrier frequencies.

The switching module 1102 is configured to perform state switching on at least one secondary uplink carrier serving cell according to the state switching decision indication.

The request sending module 1103 is configured to send a state switching request message to a base station. The state switching request message includes an activation request message or deactivation request message. The state switching request message is physical layer information, which specifically refers to a high speed shared control channel (HS-SCCH), or an enhanced dedicated channel absolute grant channel (E-AGCH) or an enhanced dedicated channel relative grant channel (E-RGCH).

Figure 12:
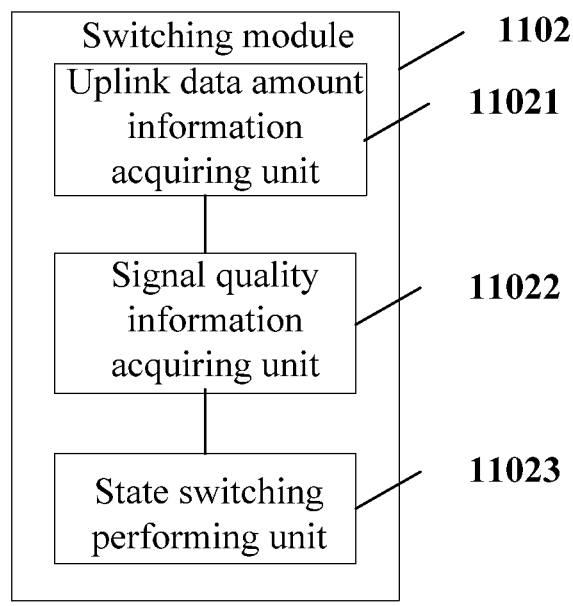
FIG. 12 is a schematic diagram of an internal structure of a switching module 1002 in FIG. 10.

Further, FIG. 12 is a schematic diagram of the switching module 1002, and the switching module 1002 includes:

The uplink data amount information acquiring unit 11021 is configured to acquire amount of uplink data of the UE.

The signal quality information acquiring unit 11022 is configured to acquire current signal quality of the secondary uplink carrier serving cell.

The state switching performing unit 11023 is configured to judge whether the state switching is performed on at least one secondary uplink carrier serving cell.

Specifically, if the amount of the uplink data exceeds an activation threshold, and the current signal quality of the secondary uplink carrier serving cell satisfies an uplink signal quality standard, the state switching performing unit 11023 is configured to switch a state of the secondary uplink carrier serving cell to an activated state. If the amount of the uplink data is lower than a deactivation threshold, the state switching performing unit 11023 is configured to switch the state of the secondary uplink carrier serving cell to a deactivated state; or if the current signal quality of the secondary uplink carrier serving cell cannot reach the uplink signal quality standard, the state switching performing unit 11023 is configured to switch the state of the secondary uplink carrier serving cell to the deactivated state.

Figure 13:
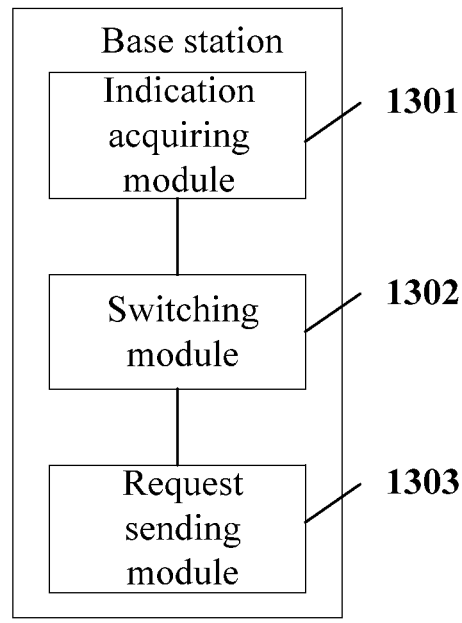
FIG. 13 is a schematic diagram of an internal structure of a base station according to an embodiment of the present invention.

FIG. 13 is a schematic diagram of a base station according to an embodiment of the present invention. As shown in FIG. 13, the base station includes:

The indication acquiring module 1301 is configured to acquire a state switching decision indication of secondary uplink carrier frequencies.

The switching module 1302 is configured to perform state switching on at least one secondary uplink carrier serving cell according to the state switching decision indication.

The request sending module 1303 is configured to send a state switching request message to the UE, where the state switching request message includes an activation request message or deactivation request message and the state switching request message is physical layer information which specifically refers to an HS-SCCH, or an E-AGCH or an E-RGCH.

Figure 14:
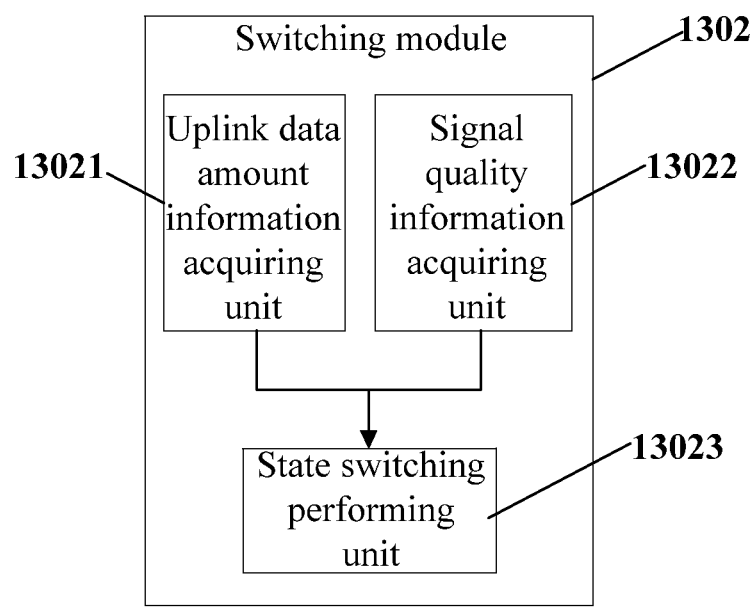
FIG. 14 is a schematic diagram of an internal structure of a switching module 1302 in FIG. 13.

Further, FIG. 14 is a schematic diagram of an internal structure of the switching module 1302, and the switching module 1302 includes a uplink data amount information acquiring unit 13021, a signal quality information acquiring unit 13022 and state switching performing unit 13023.

The uplink data amount information acquiring unit 13021 is configured to acquire amount of uplink data of the UE.

The signal quality information acquiring unit 13022 is configured to acquire current signal quality of a serving cell working at the secondary uplink carrier frequency.

The state switching performing unit 13023 is configured to judge whether the state switching is performed on at least one secondary uplink carrier serving cell.

Specifically, if the amount of the uplink data exceeds an activation threshold, and the current signal quality of the secondary uplink carrier serving cell satisfies an uplink signal quality standard, the state switching performing unit 13023 is configured to switch a state of the secondary uplink carrier serving cell to an activated state. If the amount of the uplink data is below a deactivation threshold, the state switching performing unit 13023 is configured to switch the state of the secondary uplink carrier serving cell to a deactivated state; or if the current signal quality of the secondary uplink carrier serving cell cannot reach the uplink signal quality standard, the state switching performing unit 13023 is configured to switch the state of the secondary uplink carrier serving cell to the deactivated state.

Figure 15:
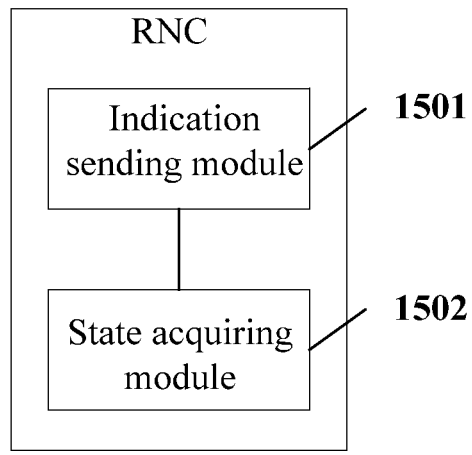
FIG. 15 is a schematic diagram of an internal structure of an RNC according to an embodiment of the present invention.

FIG. 15 is a schematic diagram of an RNC according to an embodiment of the present invention. As shown in FIG. 15, the RNC includes an indication sending module 1501 and a state acquiring module 1502.

The indication sending module 1501 is configured to send a state switching decision indication of a secondary uplink carrier serving cell.

The state acquiring module 1502 is configured to acquire a state of at least one secondary uplink carrier serving cell after at least one secondary uplink carrier serving cell, according to the state switching decision indication, completes state switching.

Figure 16:
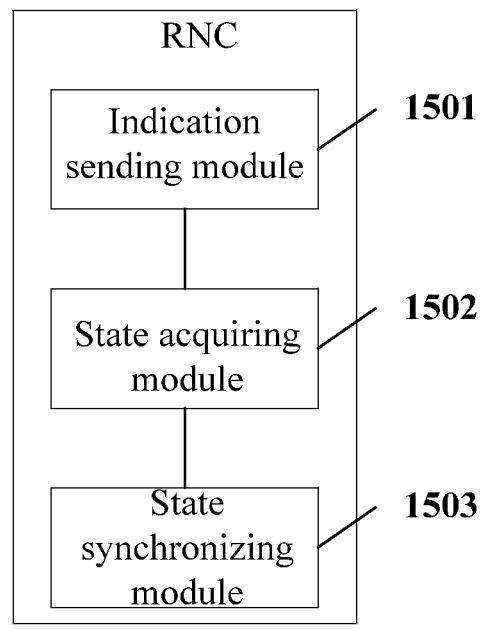
FIG. 16 is a schematic diagram of an internal structure of an RNC according to another embodiment of the present invention.

Further, as shown in FIG. 16, the RNC further includes a state synchronizing module 1503.

The state synchronizing module 1503 is configured to notify the state of the secondary uplink carrier serving cell to all other cells except the secondary uplink carrier serving cell in the secondary carrier active set after the state acquiring module acquires the state of at least one secondary uplink carrier serving cell; or notify the state of the secondary uplink carrier serving cell to all cells in the secondary carrier active set.

Figure 17:
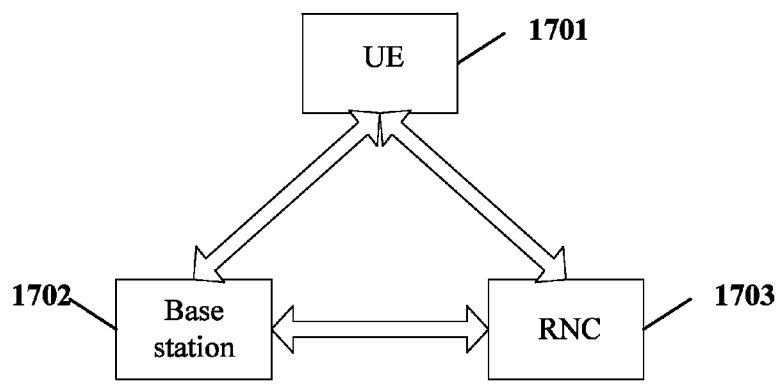
FIG. 17 is a schematic diagram of a state switching system according to an embodiment of the present invention.

FIG. 17 is a schematic diagram of a system for managing uplink carrier frequencies according to an embodiment of the present invention. As shown in FIG. 17, the system includes a UE 1701, a base station 1702, and an RNC 1703.

The UE 1701 is configured to receive a state switching decision indication of secondary uplink of a secondary uplink carrier serving cell sent by the RNC 1703; perform state switching on at least one secondary uplink carrier serving cell according to the state switching decision indication; and notify a state of at least one secondary uplink carrier serving cell to the base station 1702.

The RNC 1703 is configured to send the state switching decision indication of the secondary uplink carrier serving cell to the UE 1701; and acquire the state of at least one secondary uplink carrier serving cell after the UE 1701 completes the state switching of at least one secondary uplink carrier serving cell.

The base station 1702 is configured to receive the state of at least one secondary uplink carrier serving cell sent by the UE 1701 after the UE 1701, according to the state switching decision indication, performs the state switching on at least one secondary uplink carrier serving cell.

Figure 18:
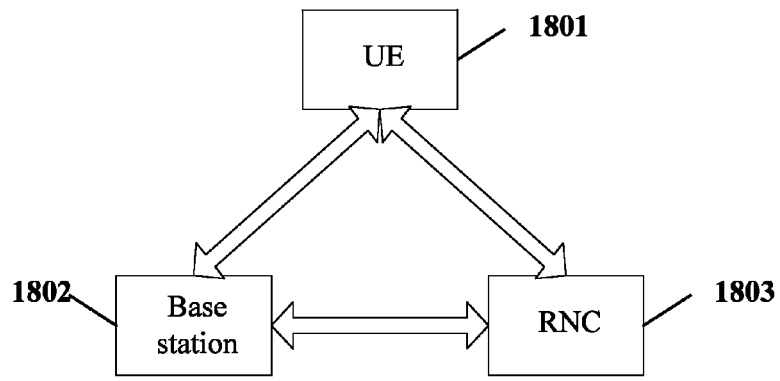
FIG. 18 is a schematic diagram of a state switching system according to another embodiment of the present invention.

FIG. 18 is a schematic diagram of a system for managing uplink carrier frequencies according to an embodiment of the present invention. As shown in FIG. 18, the system includes a UE 1801, a base station 1802, and an RNC 1803.

The base station 1802 is configured to receive a state switching decision indication sent by the RNC 1803; perform state switching on at least one secondary uplink carrier serving cell according to the state switching decision indication; and notify a state of at least one secondary uplink carrier serving cell to the UE 1801.

The RNC 1803 is configured to send the state switching decision indication of the secondary uplink carrier serving cell to the base station 1802; and acquire the state of at least one secondary uplink carrier serving cell after the base station 1802 completes the state switching of at least one secondary uplink carrier serving cell.

The UE 1801 is configured to receive the state of at least one secondary uplink carrier serving cell sent by the base station 1802 after the base station 1802, according to the state switching decision indication, performs the state switching on at least one secondary uplink carrier serving cell.

Figure 19:
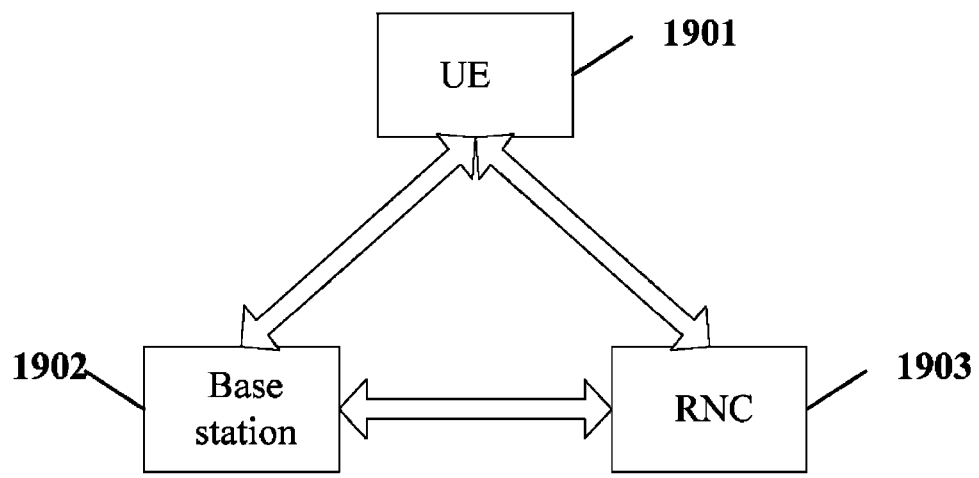
FIG. 19 is a schematic diagram of a state switching system according to another embodiment of the present invention.

FIG. 19 is a schematic diagram of a system for managing uplink carrier frequencies according to an embodiment of the present invention. As shown in FIG. 19, the system includes a UE 1901, a base station 1902, and an RNC 1903.

The RNC 1903 is configured to initiate state switching of at least one secondary uplink carrier serving cell, and send a state switching decision indication, which specifically refers to a state switching request message, of at least one secondary uplink carrier serving cell to the UE 1901 or the base station 1902.

The UE 1901 is configured to receive the state switching decision indication of at least one secondary uplink carrier serving cell sent by the RNC 1903, and perform the state switching on at least one secondary uplink carrier serving cell.

The base station 1902 is configured to receive the state switching decision indication of at least one secondary uplink carrier serving cell sent by the RNC 1903, and perform the state switching on at least one secondary uplink carrier serving cell.

The UE, the base station, the RNC and the system for managing uplink carrier frequencies may be combined with the method for managing uplink carrier frequencies provided by the embodiments of the present invention, so that state switching management of the secondary uplink carrier serving cell is triggered through the state switching decision indication, the state switching of the secondary uplink carrier serving cell is completed according to the state switching decision indication, and the state of the secondary uplink carrier serving cell is notified to a communication opposite end. Thus, a working mechanism is provided for implementing multi-cell collaboration in a data uplink direction, and a problem that multi-cell HSUPA collaboration cannot be used to transmit the uplink data is solved.

Persons of ordinary skill in the art should understand that all or a part of the steps of the method according to the embodiments of the present invention may be implemented by a program instructing relevant hardware. The program may be stored in a computer readable storage medium, and the program is run with one or a combination of the steps of the method according to the embodiments of the present invention.

In addition, the functional units in each embodiment of the present invention may be integrated in one processing module, or each unit exists separately, or two or more units are integrated in one processing module. The integrated module may be embodied in the form of hardware or a software functional module. If the integrated module is embodied in the form of a software functional module and is sold or used as a separate product, the integrated module may be stored in a computer readable storage medium.

The storage medium may be a Read-Only Memory (ROM), a magnetic disk, or a Compact Disk Read-Only Memory (CD-ROM).

The above descriptions are merely exemplary embodiments of the present invention, but not intended to limit the protection scope of the present invention. Any modification, equivalent replacement, or improvement made without departing from the spirit and principle of the present invention should fall within the protection scope of the present invention. Therefore, the protection scope of the present invention is subject to the appended claims.

What is claimed is:

1. A method for managing uplink carrier frequencies, comprising:
    receiving, by a Radio Network Controller (RNC), through a Node B Application Part (NBAP) message from a base station, a result of state switching performed by a User Equipment (UE) on a secondary uplink carrier serving cell, wherein the result of state switching performed by the UE on the secondary uplink carrier serving cell is contained in a state switching response message, and wherein a decision of the state switching on a secondary uplink carrier serving cell by the UE is made by the base station;
    sending, by the RNC, a state notification message, which indicates the result of state switching performed by the UE on the secondary uplink carrier serving cell, to a secondary uplink carrier non-serving cell in a secondary carrier active set.

2. The method for managing uplink carrier frequencies according to claim 1, wherein the state notification message is an NBAP message or Frame Protocol (FP) frame.

3. The method for managing uplink carrier frequencies according to claim 1, wherein the state switching response message is sent through a high speed dedicated physical control channel (HS-DPCCH).

4. The method for managing uplink carrier frequencies according to claim 1, wherein the result of the state switching comprises the secondary uplink carrier serving cell is activated or the secondary uplink carrier serving cell is deactivated.

5. The method for managing uplink carrier frequencies according to claim 1, further comprising:
    stopping, by the secondary uplink carrier non-serving cell in the secondary carrier active set, detecting an uplink dedicated physical control channel (DPCCH).

* * * * *